US009292729B2

(12) United States Patent
Guthrie et al.

(10) Patent No.: US 9,292,729 B2
(45) Date of Patent: Mar. 22, 2016

(54) METHOD AND SOFTWARE FOR ANALYSING MICROBIAL GROWTH

(75) Inventors: Lusia Halina Guthrie, Dulwich (AU); John Hughes Glasson, Adelaide (AU); Anton John van den Hengel, Adelaide (AU); Rhys Ernst Hill, Adelaide (AU); Benjamin William Stephen Ward, Adelaide (AU)

(73) Assignee: LBT Innovations Limited, Adelaide, South Australia (AU)

( * ) Notice: Subject to any disclaimer, the term of this patent is extended or adjusted under 35 U.S.C. 154(b) by 60 days.

(21) Appl. No.: 14/002,722

(22) PCT Filed: Mar. 2, 2012

(86) PCT No.: PCT/AU2012/000211
§ 371 (c)(1),
(2), (4) Date: Apr. 8, 2014

(87) PCT Pub. No.: WO2012/119191
PCT Pub. Date: Sep. 13, 2012

(65) Prior Publication Data
US 2014/0219538 A1 Aug. 7, 2014

(30) Foreign Application Priority Data

Mar. 4, 2011 (AU) ................................ 2011900786

(51) Int. Cl.
*G06K 9/00* (2006.01)
*G06T 7/00* (2006.01)
*G06K 9/46* (2006.01)

(52) U.S. Cl.
CPC ........ *G06K 9/00147* (2013.01); *G06K 9/00127* (2013.01); *G06K 9/469* (2013.01); *G06T 7/0012* (2013.01); *G06T 2207/30024* (2013.01)

(58) Field of Classification Search
None
See application file for complete search history.

(56) References Cited

U.S. PATENT DOCUMENTS

| 6,690,817 B1* | 2/2004 | Cabib et al. ................... 382/134 |
| 2004/0253660 A1 | 12/2004 | Gibbs et al. |
| 2006/0039593 A1* | 2/2006 | Sammak et al. .............. 382/133 |
| 2006/0245631 A1* | 11/2006 | Levenson et al. ............. 382/133 |
| 2008/0082468 A1* | 4/2008 | Long et al. ...................... 706/12 |
| 2010/0022408 A1 | 1/2010 | Singh et al. |

OTHER PUBLICATIONS

WIPO, Australian International Search Authority, International Search Report mailed May 15, 2012 in International Patent Application No. PCT/AU2012/000211, 2 pages.

(Continued)

*Primary Examiner* — Shervin Nakhjavan
(74) *Attorney, Agent, or Firm* — Inskeep IP Group, Inc.

(57) ABSTRACT

A method for analysing microbial growth on a solid culture medium, the method including obtaining image data of the solid culture medium and any microbial growth, generating an associated feature vector of values obtained by applying one or more filters to the image data, using a classifier to classify each pixel in a plurality of pixels in the image data based on the associated feature vector, analysing results of pixel classifications of each said pixel to derive a microbiological assessment of the solid culture medium and any microbial growth, and outputting the microbiological assessment.

20 Claims, 19 Drawing Sheets

(56) References Cited

OTHER PUBLICATIONS

Ciesielski et al., "A Comparison of Image Processing Techniques and Neural Networks for an Automated Visual Inspection Problem," In Adams A. and Sterling L. (editors) *Proceedings of the 5th Joint Australian Converence on Artificial Intelligence*, pp. 147-152, Hobart, Tasmania, World Scientific, 1992.

European Patent Office, Extended European Search Report mailed Sep. 9, 2014 in European Patent Application No. 12754708.1-1901/2681715, 16 pages.

Allène, C. et al., "Some links between extremum spanning forests, watersheds and min-cuts," *Image and Vision Computing*, vol. 28 Issue 10, Oct. 2010, pp. 1460-1471, 12 pages.

Chen, Wei-Bang et al., "An automated bacterial colony counting and classification system," *Int Syst Front*, Feb. 18, 2009, pp. 349-368, 20 pages.

Roe, B.P. et al., "Boosted decision trees as an alternative to artificial neural networks for particle identification," *Nuclear Instruments and Methods in Physics Research*, vol. A 543, Jan. 25, 2005, pp. 577-584, 8 pages.

Dahle, J. et al., "Automated Counting of Mammalian Cell Colonies by Means of a Flat Bed Scanner and Image Processing," *Cytometry*, Part A, Wiley-Liss, Inc., Aug. 2004, pp. 182-188, 8 pages.

Marotz, J. et al., "Effective object recognition for automated counting of colonies in Petri dishes (automated colony counting)," *Computer Methods and Programs in Biomedicine*, vol. 66, Sep. 2001, pp. 183-198, 16 pages.

Mukherjee, D.P. et al., "Bacterial colony counting using distance transform," *International Journal of Bio-Medical Computing*, vol. 38, No. 2, Feb. 1995, pp. 131-140, 10 pages.

Ciesielski, V. et al., "A comparison of image processing techniques and neural networks for an automated visual inspection problem," *In Proc. 5th Joint Australian Conference on Artificial Intelligence*, 1992, pp. 147-152, 6 pages.

\* cited by examiner (a) Full mapping function (b) Hue mapping function (c) Saturation mapping function (a) Position (a) dx  (b) dy (c) Smoothness 5x5  (d) Smoothness 13x13  (e) Smoothness 21x21

METHOD AND SOFTWARE FOR ANALYSING MICROBIAL GROWTH

RELATED APPLICATIONS

This application claims priority to and is the U.S. National Phase of international patent application number PCT/AU2012/000211, International Filing Date 2 Mar. 2012, entitled Method And Software For Analysing Microbial Growth, which claims priority to Australian Provisional Patent Application No. 2011900786 filed on 4 Mar. 2011, entitled Method And Software For Analysing Microbial Growth, both of which are incorporated herein by reference in their entireties.

FIELD OF THE INVENTION

The present invention relates to a method and software for analysing microbial growth on a solid culture medium, particularly microbial growth in the form of isolated bacterial colonies grown following the inoculation and incubation of the solid culture medium with a microbiological sample. It is envisaged that the method and software of the present invention will find use in a microbiological laboratory.

BACKGROUND TO THE INVENTION

The isolation of individual colonies of micro-organisms (and in particular bacteria) is an important procedure in many microbiological laboratories. This isolation of bacteria is normally done either manually by skilled laboratory technologists or automatically by robotic streaking equipment. In either case, a microbiological sample is first dispensed upon the surface of a solid culture medium followed by the spreading of the microbiological sample across the surface of the medium (called "streaking"). Typically, multiple streaks are made of increasing dilution of the inoculum across the solid culture medium.

The streaks of increasing dilution tend to provide, generally towards the tail of the streaks, a number of single cells that allow for the growth of isolated microbiological colonies after incubation. These isolated colonies may then be analysed for various physical features e.g. colony morphology, and may undergo staining and other procedures which may be necessary for determining, for example, the genus, the species and/or the strain of the previously unidentified organism in the microbiological sample.

Traditionally, this analysis has been carried out visually in a microbiological laboratory by skilled technologists, resulting in the technologist making a microbiological assessment. This assessment may be based on the detection of the presence or absence of bacterial colonies, the detection of colour(s) of each colony type, the mapping of colour distribution to determine the presence of variations in colour which could be attributed to fermentation or haemolysis, the differentiation between confluent and isolated colony growth, the measurement of colony texture or viscosity, and the determination of two-dimensional and three-dimensional shape, and/or enumeration of the different types of colonies.

Where growth of potentially pathogenic bacteria is identified, the solid culture medium is progressed to the next step of the laboratory workflow and becomes the subject of further confirmatory identification and antibiotic susceptibility testing, in line with current regulatory requirements.

It is an aim of the present invention to provide a method and software for analysing images in order to provide a microbiological assessment, where this assessment is generated without any (or with only minor) human operator intervention.

Before turning to a summary of the present invention, it must be appreciated that the above description of the prior art has been provided merely as background to explain the context of the invention. It is not to be taken as an admission that any of the material referred to was published or known, or was a part of the common general knowledge in Australia or elsewhere.

SUMMARY OF THE INVENTION

The present invention provides a method for analysing microbial growth on a solid culture medium, the method including:
  obtaining image data of the solid culture medium and any microbial growth,
  for a plurality of pixels in the image data, generating an associated feature vector of values obtained by applying one or more filters to the image data,
  using a classifier to classify each pixel in the plurality of pixels based on the associated feature vector,
  analysing results of the pixel classifications of each said pixel to derive a microbiological assessment of the solid culture medium and any microbial growth, and
  outputting the microbiological assessment.

It will be appreciated by those persons skilled in the art that, with respect to the phrase "on a solid culture medium", the word "on" is used to encompass microbial growth both upon the surface of the solid culture medium and within the solid culture medium. The term "solid culture medium" will hereinafter often be simply referred to as "medium" in the specification. For example, it will be appreciated that a microbiological sample, hereinafter often referred to simply as a "sample", can be dispensed either upon the surface of the medium or within the medium so that microbial growth can be grown following the inoculation and incubation of the medium with the sample. That is, the microbial growth on the medium results from the inoculation and incubation of the sample, such as a urine sample, an enteric sample, a blood sample, a lymph sample, a tissue sample, a water sample, a food sample or other relevant sample, on the medium.

In addition, it will also be appreciated by those persons skilled in the art that the medium will usually be, for example, agar and will usually be contained in a container such as a plate, and, in a more specific example, a Petri dish, which may have a lid. The combination of the medium and the plate is hereinafter referred to throughout the specification as a "culture plate" which might sometimes be referred to in the art as an "agar plate".

The present invention uses the classifier for classifying pixels in an image of the medium with or without microbial growth in order to provide the microbiological assessment. Little or no human operator intervention is required. This may enable a saving of the time to sort culture plates and may allow more effective utilisation of skilled human resources, which can be diverted to other tasks. For example, the method includes classifying the microbial growth on the medium based on the results of the pixel classifications.

In another example, the method further includes enumerating one or more colonies of the microbial growth based on the results of the pixel classifications. The method can then analyse the results of the pixel classifications using, for example, a connected components algorithm to determine a series of regions indicative of predicted colonies of the microbial growth. In this case, the method further includes the step of enumerating the colonies of the microbial growth from the series of regions based on a size and/or shape of each of said regions.

The microbial growth may include, for example, one or more bacterial growths, fungal growths, viral plaques or protist growths and the growth may take the form of a colony, mycelium, hypha, plaque or other visible microbial structure. In some embodiments, each microbial growth may be growth that originates from a single microbe (such as where a sample is applied to a medium in a diluted manner such that individual microbes are separated).

The medium may include any medium which supports the growth of a microbe. As such, a medium may contain one or more microbial nutrients including, for example, a carbon source, a nitrogen source, essential elements and/or essential vitamins. The medium will also typically contain a gelling agent including, for example, gelatine, agar, gellan gum, agarose or agargel.

In some embodiments, the medium may include a selective culture medium, which is generally known in the art to include media with restricted nutrient compositions, media containing an antibiotic, or the like, that allow for the growth of some microorganisms while preventing growth of other micro-organisms.

In some embodiments, the sample for analysis is disposed on more than one culture plate or a split culture plate having more than one segment. In these embodiments, the analysis of microbial growth is performed by taking images across the different culture plates, or segments, and the results of the pixel classifications are analysed as above so that a microbiological assessment can be made based on a comparison of microbial growth on the different culture plates or segments.

It will be appreciated that some microbiological samples may not result in microbial growth on a particular medium. For example, the microbiological sample may not include a microbe capable of growth on a selective medium (e.g. a medium containing a specific antibiotic or nutrient composition that restricts growth of some microbes) or the microbiological sample may be sterile (e.g. not include any microbes). In these cases, the image data obtained for the medium may not include a microbial growth on the medium (e.g. a negative result).

In an example, the microbiological assessment may be used to identify whether the culture plate falls into one of up to 4 categories—1. waste (e.g. the culture plate showed no pathogens), 2. reincubation required, 3. identification of potentially pathogenic bacteria (e.g. the culture plate showed a positive result and requires review in accordance with regulations) or 4. for human review (e.g. the computer was unable to make a clear decision, such as in categories 1 to 3, or a skilled operator directed the culture plate to a required output station).

This assessment of the medium and any microbial growth from the analysis of the image data is indicative of an assessment performed by a skilled technologist, as described above. That is, the assessment includes the detection of microbial growth colonies in the medium and can include, for example, the classification of these colonies, such as bacterial colonies, and the mapping of medium colour distribution to determine the presence of variations in colour which could be attributed to fermentation or haemolysis, the differentiation between confluent and isolated colony growth, the measurement of colony texture or viscosity, and the determination of two-dimensional and three-dimensional shape, and/or enumeration of the different types of colony on the medium.

The image data for the medium and any microbial growth thereon may include one or more images taken using an image capture device, such as a high resolution colour digital camera, a laser range finder or any other appropriate device. In one example, the image data is obtained from an existing image which could have, for example, been taken for another purpose. In another example, the image data is obtained from an image taken using an image capture device dedicated to the present method. In any event, the images may be processed to produce the image data, for example a plurality of images including the same microbial growth may be averaged, demosaiced and colour calibrated. The image data may include a series of such processed images, for example taken using different lighting configurations. Further details of image capture and processing will be given below.

The classifier may be a boosted classifier. Alternatively, the classifier may be a decision tree, random forest, or may use Linear Discriminant Analysis (LDA) or any other technique to classify the pixels. A boosted classifier combines the output of a set of "weak" classifiers (with low, but better than random, classification accuracy) to produce a single "strong" classifier with high accuracy. In combining the weak classifiers, the result of each weak classifier is preferably weighted according to the confidence in the correctness of the weak classifier. An example of an appropriate boosting algorithm for creating the boosted classifier is Discrete AdaBoost, which will be described in more detail below. Discrete AdaBoost is a variant of AdaBoost, described in Yoav Freund and Robert E. Schapire. "*A decision-theoretic generalization of on-line learning and an application to boosting.*" J. Comput. Syst. Sci., 55:119-139, August 1997, the contents of which are herein incorporated by reference. Discrete AdaBoost adaptively improves the performance of the classifier by giving greater weight to examples misclassified by a weak classifier when training the next weak classifier. Other boosting algorithms may alternatively be used, such as Real AdaBoost, Gentle AdaBoost or FilterBoost. The variants use different methods of weighting and training the weak classifiers.

In an embodiment, the classifier used to classify the pixels is a boosted decision tree classifier. In this embodiment, the weak classifiers used are decision trees. Decision trees are binary trees where each node contains a rule, each branch represents a result of the rule, and hence a decision, and each leaf representing a classification. In this arrangement, each rule is a test on a value in the feature vector in the form $x_i < t$ where $x_i$ is a value from the feature vector $x=(x_1, \ldots, x_n)$ and t is a threshold value. The tree is traversed from the root node to classify a single feature vector. A common arrangement is that if a test passes the left branch of that node is traversed, otherwise the right branch is traversed instead.

The boosted decision tree classifier may be a multi-class classifier. For example, the AdaBoost.MH (Multi-Label Hamming) procedure may be used for classifying the pixels into one of a plurality of classes. The AdaBoost.MH algorithm is described in Jerome Friedman, Trevor Hastie, and Robert Tibshirani. "*Additive logistic regression: a statistical view of boosting.*" Annals of Statistics, 28:2000, 1998, the contents of which are herein incorporated by reference.

For better classification speed and performance, classification may be performed as a two stage process. For example, the method may include using a first classifier to initially classify each pixel as one of a first plurality of classes, and subsequently using a second classifier to classify each pixel in one or more of the first plurality of classes as one of a second plurality of classes. The result is a chain of dependent classifiers, where the output of the first classifier is used to either augment the feature vectors or restrict the applicable pixels when training the second classifier. The first classifier may be a binary cascade classifier to initially classify each pixel as background or non-background, and the second classifier may be a multi-class boosted decision tree classifier to classify each non-background pixel as one of the second plurality of classes.

The initial coarse classification of background pixels reduces the number of pixels that need to be more accurately classified into one of the colony types. The initial binary classification may have a high false positive rate (background pixels classified as non-background) as misclassified pixels can be correctly classified in the next stage. A suitable initial binary classifier may follow the cascade classifier method described in Paul Viola and Michael Jones *"Robust real-time object detection"*, Second International Workshop on Statistical and Computational Theories of Vision, Jul. 13 2001, the contents of which are herein incorporated by reference.

The classes may represent organism genus, species or strains, agar types, background, non-background. The classes are flexible, to allow for different agar types and organism types that may be of interest to different end-users.

The method may further include assigning a confidence value to each pixel classification. The confidence value represents the probability of correct classification of the pixel.

The method may further include applying a post processing algorithm to improve the results of the pixel classifications. A range of different algorithms may be applied to remove spurious labels or uncertain areas. For example, the post processing algorithm may include morphological operations such as dilation or erosion or, alternatively, a graph cut. An example of a suitable graph cut algorithm is given in Yuri Boykov, Olga Veksler, and Ramin Zabih *"Fast approximate energy minimization via graph cuts"* IEEE Trans. Pattern Anal. Mach. Intell., 23:1222-1239, November 2001., the contents of which are herein incorporated by reference. Graph cut algorithms compute an optimal partitioning of a graph into two or more sets. The application of the graph cut algorithm may lead to the reclassification of some of the pixels in the image data. Applying a graph cut algorithm may include:

(a) constructing a graph having a plurality of nodes, each node corresponding to one of the plurality of pixels in the image data, and a plurality of labels, each label corresponding to a class, (b) adding edges between nodes corresponding to neighbouring pixels in the image data, (c) adding edges between each node and each label, and (d) using the graph cut algorithm to cut edges to a node and partition the graph into classes, the graph cut algorithm being based on the pixel classification results for the pixel corresponding to that node and neighbouring pixels.

Applying a graph cut algorithm may improve the classification results for pixel classifications that have been given low confidence by the classifier. The graph cut algorithm may take into account the confidence value of the pixel classification for the pixel corresponding to that node and/or the confidence value of the pixel classification for neighbouring pixels. This spatially smoothes the results, reducing noise in the final classifications. In particular, the high confidence annotations will normally be kept, while low confidence annotations may be replaced to obtain a more homogeneous output. For example, if a low confidence pixel is surrounded by neighbouring pixels classified into the same class with high confidence, there can be more confidence in the low confidence pixel's classification. By the same token, if the neighbouring pixels are classified into a different class with high confidence, there is a strong case for changing the low confidence pixel's classification to that class.

The graph cut algorithm may be a multi-class graph cut algorithm, which partitions the graph into three or more sets. This is a more complicated algorithm than a binary graph cut, but allows a more meaningful assessment to be provided as the pixels may be classified more specifically. Such an algorithm may be an alpha expansion procedure. In alpha expansion, a series of graph cuts are performed, each time segmenting between the current label for each node, and a candidate label from the set of possible labels. This procedure is repeated, iterating through each possible label, until convergence. In constructing the graph, auxiliary nodes are added between adjacent nodes with different labels, to include the cost of this labelling in the cut.

Further details of appropriate graph cut algorithms are described in the co-pending International application to the same Applicant and with the same filing date titled "Method for Improving Classification Results of a Classifier", the contents of which are herein incorporated by reference.

Turning now to the feature vector $x=(x_1, \ldots, x_n)$ that is input into the classifier. The feature vector may be composed of values taken from feature images, which are created by applying one or more filters to the image data for the sample. Obtaining feature images is an intermediate step, and it will be appreciated that alternatively the feature vectors could be composed of values taken by applying the filters on a pixel-by-pixel basis. The term "filter" is to be understood to encompass any image processing or other algorithm that converts part or all of the image data into one or more values that may be input into the classifier.

The one or more filters may be chosen from a group including:

RGB filter, which creates up to three feature images, one for the red channel, one for the green channel and one for the blue channel.

LAB filter, which creates up to three or more feature images in the LAB colour space, where L represents lightness and A and B contain chromatic colour information.

Oriented Gaussian Filter, which applies a 1D Gaussian kernel in a variety of directions to the image. It is also possible to utilise first and second order derivatives of the Gaussian kernel.

Position filter, which for example creates a feature image showing the distance of each pixel from the edge of the culture plate. Other position filters may show the distance of each pixel from a particular label, if the filter is applied when the output of a previous classifier is available.

Colour quantisation filter, where the number of colours in the image is reduced, usually via a histogram, to help locate areas of similar colour, and Texture filter, which creates one or more feature images measuring texture around each pixel.

The filters may enhance the differences between colonies and the medium and the plate itself. Some of the filters include a feedback mechanism, whereby the output from a previous classifier can be used as an input.

The feature vectors may be constructed using any number of filters. For example, the feature vector for a pixel may include 9 values: $x_1$, $x_2$ and $x_3$ corresponding to the R, G and B channel values for that pixel, $x_4$, $x_5$ and $x_6$, corresponding to the L, A and B values for that pixel, $x_7$ corresponding to the distance of the pixel from the edge of the plate and $x_8$ and $x_9$ corresponding to image gradients in the x and y directions. It will be appreciated that any number of feature values may be used and feature values may be taken from different image data for the same growth (e.g. lit by a top light or a bottom light).

In relation to texture, applying one or more filters to the image data may include measuring texture of the image data by
 (a) extracting gradient values for each pixel in the image, and
 (b) computing a trace of a covariance matrix of gradient values in a window around each pixel.

The gradient values may be extracted by convolving in x and y directions of the image data using a Sobel kernel. The use of a Sobel kernel smooths the image at the same time as extracting gradient information. Computing the trace of the covariance matrix of the image gradients measures the variability of the gradients in the region and hence the degree of texture, providing a "smoothness" metric.

The computation required during training may be reduced by sparsely sampling the plurality of pixels from the image data. This is especially useful for large images. Two algorithms that may be used include dense or sparse sampling. Dense sampling takes every 1/N pixels, whereas the sparse sampling method takes N pixels at random from the available pool of labelled pixels in the image data. In training, the sparse sampling method constructs a separate pool for each class being trained, leading to N pixels being available for every class. The dense method constructs a single pool for all of the classes, so the number of pixels in each class will depend on the distribution of that class in the images.

The method may also identify the medium as a negative control. For example, the classifier may classify pixels as background, or non-growth. The method may determine whether the number of pixels classified as background exceeds a predefined minimum number for the image capture and analysis to be valid. The predetermined minimum number of pixels that must be classified as background (e.g. bare agar) may be derived from a table of values that depend on the type of agar and the other bacteria that are identified on the culture plate. Note that the maximum is simply the number of pixels that lie on the culture plate in the image.

As a further check on the integrity of the image capture and analysis, the confidence of the classifications may be examined. If any regions of sufficient size exist with consistently low confidence, it is likely that an unknown item is on the culture plate. In this case, the operator can be alerted, or the culture plate marked for inspection.

To generate the assessment, the results of the pixel classifications are analysed. This may involve processing the pixel classifications to extract additional metadata, such as colony counts, colony sizes, the range of organisms present on the culture plate, growth patterns, haemolysis, artifacts, contaminants, defects in the agar, etc, as described above.

The number of each type of colony is counted (enumerated) using a process known as quantitation. It will be appreciated by those persons skilled in the art that counting the colonies is a difficult task, since many colonies may not be isolated from each other. Three approaches are therefore proposed:
 1. Basic counting, where the colony count is estimated by determining an average colony size for each organism type on each type of agar. The number of pixels of each organism detected on a particular culture plate can be divided by this number to yield the number of colonies.
 2. Density based counting, where the distance from the edge of each colony is included in the counting algorithm. This is based on the observation that large areas of growth should be counted as several distinct colonies. Hence interior pixels in the centre of a colony are assigned higher weight to achieve such an outcome. A table is formed from measuring many colony counts manually, and tabulating the results against this metric. The table may then be used to obtain a colony count from the metric when evaluated on an unseen culture plate.
 3. Image processing-based counting, where the image containing the labels is analysed first by a connected components algorithm. Each component detected by this algorithm is examined in turn. If a particular colony is deemed too large by a preset table of thresholds, then the method proposed as number one is applied. If the colony is deemed too small, it is counted as a single colony. Otherwise, the shape of the component may be considered. If it appears circular, it counts as a single colony. Otherwise, a watershed algorithm is applied to divide the component into individual colonies, each of which increments the colony count.

Subsequently, an algorithm will compute an appropriate enumeration of each colony type detected on the culture plate. Such an enumeration is meaningful to a domain expert, and may take the form of a quadrant specification, such as '1+', or an estimate of the number of colonies per milliliter of solution, such as $10^3$ cfu/ml. The enumerations of one or more culture plates are then combined to derive the assessment of the sample.

In generating the assessment, the method may also use clinical rules to interpret the classifications generated by the classifier, and/or the quantitation (enumeration) generated, as described above. These clinical rules may assess the age or clinical condition of the patient, the type of patient sample analysed, the type of bacteria identified, local laboratory practice or a range of other custom user-defined conditions that will override the normal decisions of the classifier. The clinical rules provide a bridge from the low-level assessment provided by the software, such as exact colony counts and sizes, to a typical high-level assessment in a format appropriate for a laboratory technologist, where only salient information is reported.

Details of appropriate apparatus that may be used with the method are provided in the co-pending International patent application to the same Applicant and with the same filing date titled "Image Capture and Lighting Apparatus", the contents of which are herein incorporated by reference.

It will be appreciated that the method is not limited to use with this apparatus, and image data for the medium may be obtained by any suitable arrangement of one or more image capture devices (e.g. cameras) with one or more lighting devices.

The image data may include the image of the surface of the medium, the plate containing the medium and of the area about the culture plate. Ideally, the image data will be stored in a database along with relevant plate data, including the plate barcode data, the image acquisition parameters, a time/date stamp, and image capture device specification data.

To perform an accurate analysis of the image data indicative of microbial growth, high quality and precise image data is required. Steps can be taken to process the raw images from the image capture device into a suitable form. Processing the captured images may include averaging a series of captured images, followed by demosiacing, white balance and colour correction to obtain the image data suitable for analysis.

Details of colour calibration methods that may be used are described in the co-pending International patent application to the same Applicant and with the same filing date titled "Colour Calibration Method for an Image Capture Device", the contents of which are herein incorporated by reference.

In an example, the apparatus and the method can provide a complete image acquisition and analysis function, and can be provided to a laboratory as a complete package. Alternatively, the image data may be sourced from another supplier, location or country, remote from where the method steps of the present invention are conducted, and so any image acquisition apparatus used to obtain the image data may also be located away from where the analysis of the image data takes place.

The present invention extends to software for use with a computer including a processor and memory for storing the software, the software including a series of instructions executable by the processor to carry out the method in accordance with any one of the embodiments described above.

The present invention also extends to a computer readable media including the software, and apparatus including a processor, a memory and software resident in memory accessible to the processor, the software executable by the processor to carry out the method in accordance with any one of the embodiments described above.

In another aspect, the present invention provides a method for training a classifier for use in analysing microbial growth on a solid culture medium, the method including:
   obtaining image data for a plurality of samples of microbial growth on the solid culture medium;
   for each of a plurality of pixels in the image data, generating an associated feature vector of values obtained by applying one or more filters to the image data; and
   using the associated feature vectors to train a classifier to classify each pixel in the plurality of pixels according to a label associated with the pixel in the image data.

Preferably, results of pixel classifications of each said pixel are analysed to derive a microbiological assessment of the microbial growth on the solid culture medium.

BRIEF DESCRIPTION OF THE DRAWINGS

Embodiments of the present invention will now be described, by way of example only, with reference to the accompanying drawings. It is to be understood that the particularity of the drawings does not supersede the generality of the preceding description of the invention.

DETAILED DESCRIPTION OF AN EMBODIMENT

Figure 1:
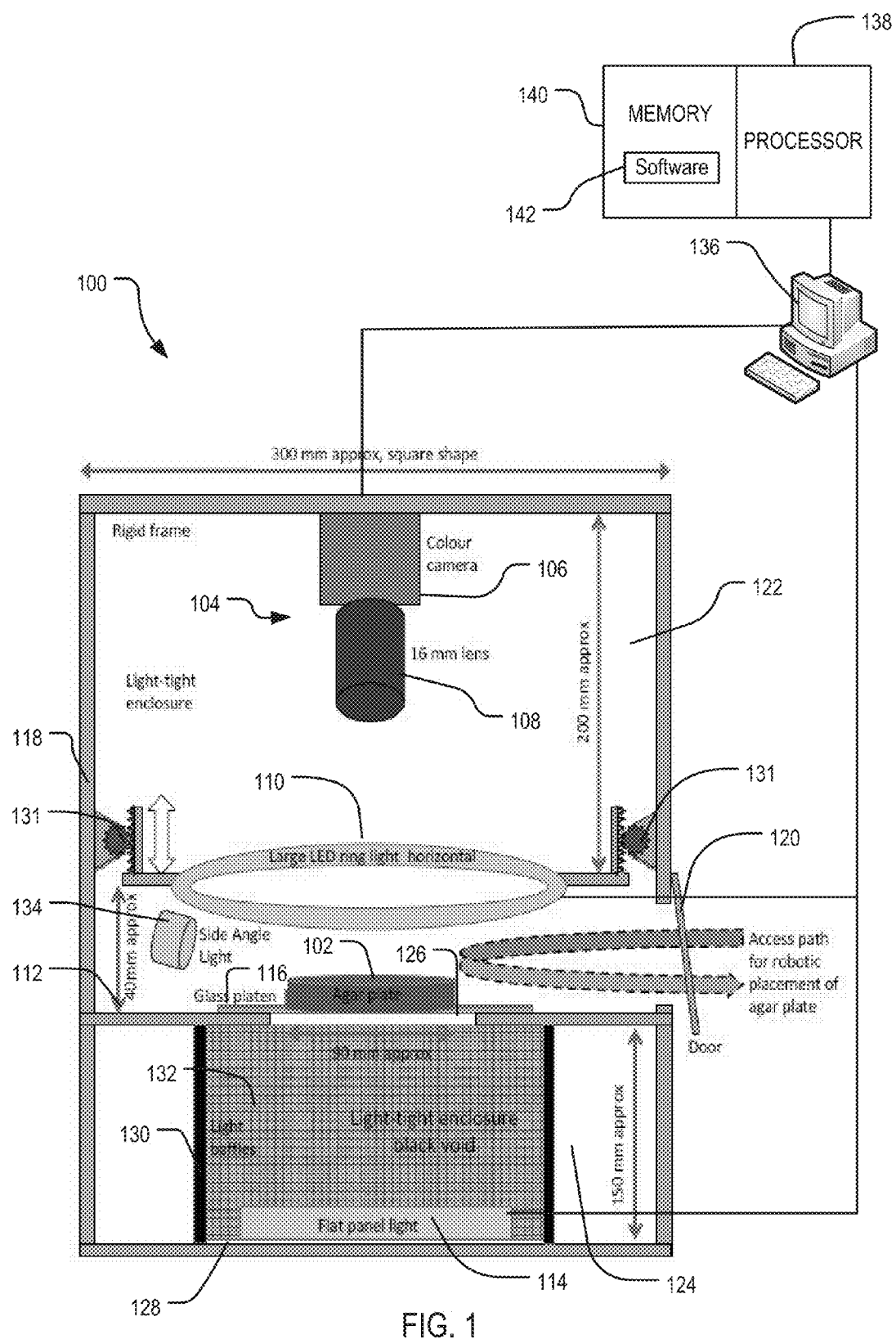
FIG. 1 is a schematic diagram of an apparatus for use in analysing microbial growth on a solid culture medium in a culture plate.
Figure 2A:
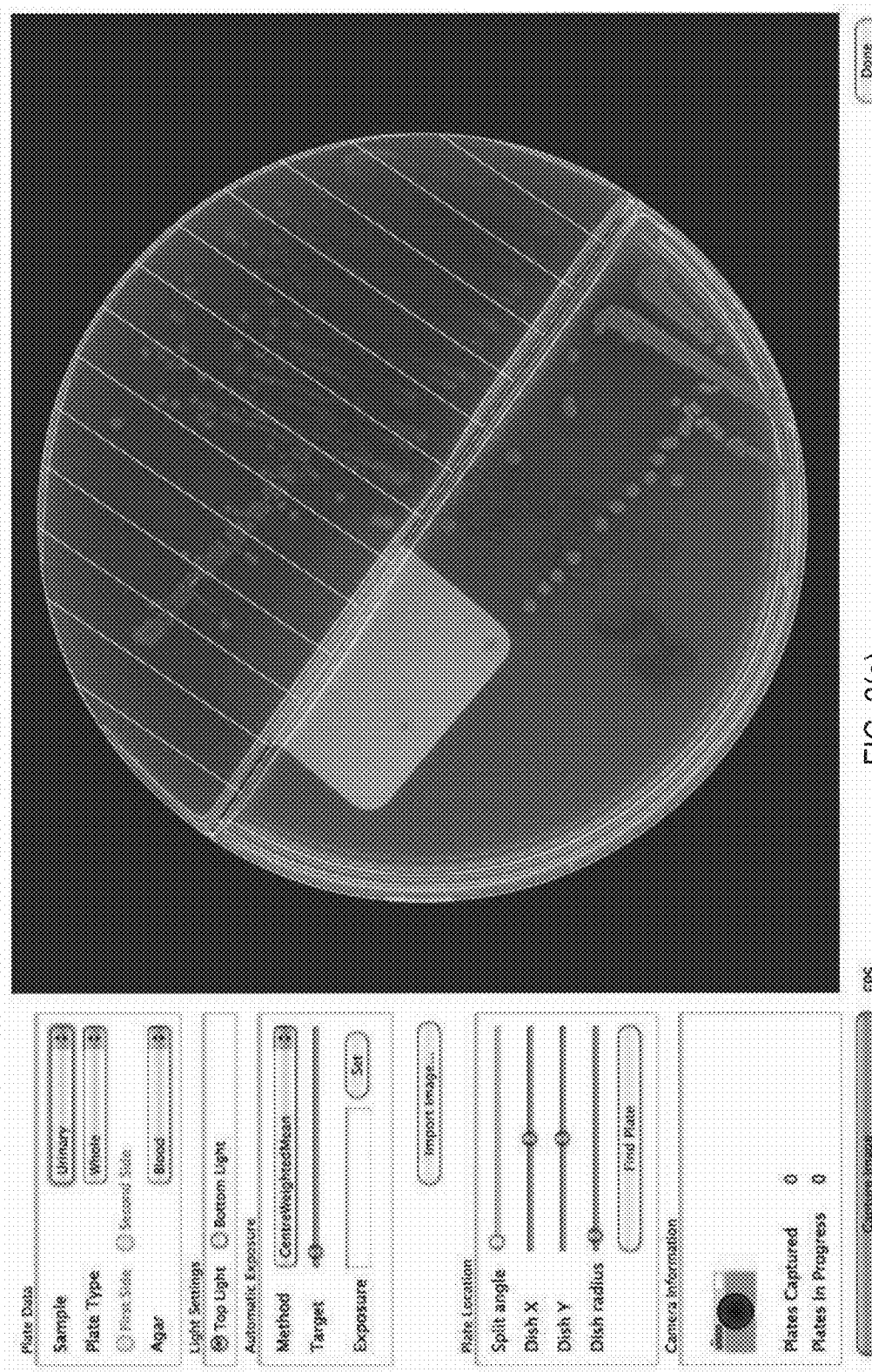
FIG. 2(a) is a screen shot of a GUI for a user to capture images.
Figure 2C:
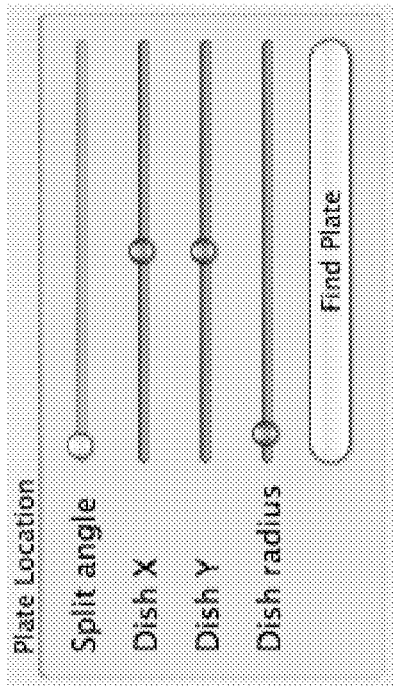
FIGS. 2(b) to 2(e) are close up views of details on the left side of the screen shot of FIG. 2(a).
Figure 2E:
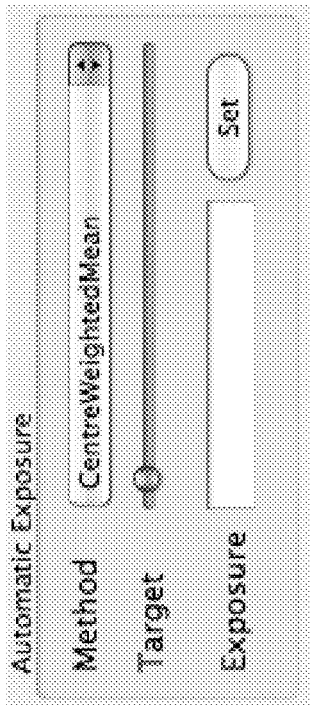
Figure 2B:
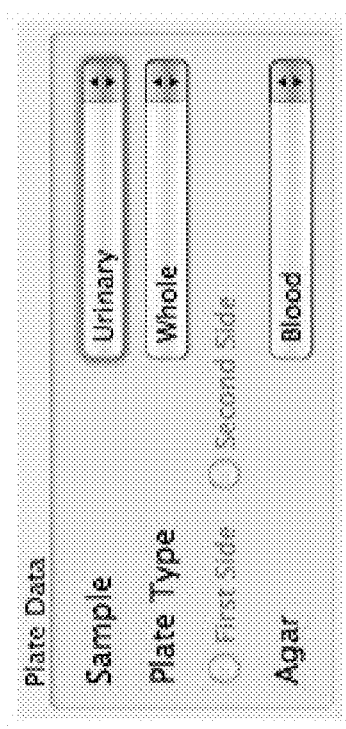
Figure 2D:
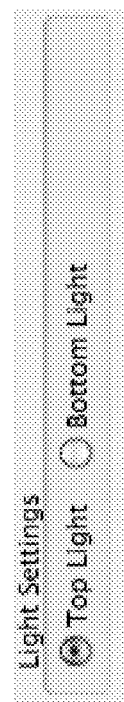

Overview of the Computer Software
   There are four main components of the software:
   a library of data that is used to store and manage information and processes,
   software in the form of command line programs that are executed on a server for training the boosted classifier, and
   a GUI program run on a desktop computer is used to capture and process images, and to generate reports for unknown culture plates, and
   a GUI program run on a desktop computer to provide training labels, and to manipulate metadata.

In the library, Extensible Markup Language (XML) files are used to store metadata and the Portable Network Graphics (PNG) format is used to store images. All files may be stored directly on disk or in a database. Metadata is stored in three main XML file types: an image metadata file, a plate metadata file, and a main metadata file for storing additional metadata and linking the image and plate metadata files together. The library may be linked to a Laboratory Information Management System (LIMS) to access information about the patient and sample.

Images data is stored in four ways: an image metadata file, the unprocessed image (raw values read from the camera), the processed image (that has been demosaiced and colour corrected) and a preview image (having a smaller size). The image metadata file captures a range of information. An example image metadata file is shown below:

Listing 1: An example image metadata file

```
1  <?xml version="1.0" encoding="UTF-8"?>
2  <metadata>
3    <raw>
4      <image_ref path="Images/raw_0.png" width="1024"
           height="768" filesize="12345" md5="..."/>
5    </raw>
6    <rgb>
7      <image_ref path="Images/rgb_0.png" width="1024"
           height="768" filesize="12345" md5="..."/>
8    </rgb>
9    <preview>
10     <image_ref path="Images/preview_0.png" width="128"
           height="96" filesize="1234" md5="..."/>
11   </preview>
12   <exposure time="1034"/>
13   <date day="13" month="6" year="2010" time="11:35:14"
          tz="CST" daylightsavings="0"/>
14   <lights>
15     <light name="top" state="on"/>
16     <light name="bottom" state="off"/>
17   </lights>
18   <colour_transform>
19     <white_balance v0="1" v1="1" v2="1"/>
20     <curve v0="1" v1="1" v2="-0"/>
21     <hue_shift v0="0" v1="0" v2="0" v3="0" v4="0" v5="0"
          v6="0" v7="0" v8="0" v9="0" v10="0" v11="0"/>
22     <saturation_scale v0="1" v1="1" v2="1" v3="1" v4="1"
          v5="1" v6="1" v7="1" v8="1" v9="1" v10="1" v11="1"/>
23   </colour_transform>
24   <camera model="BP4958" bayer="rggb"/>
25 </metadata>
```

The metadata stored includes the exposure time, date of capture, light information, colour transform used to correct the image and camera data. A set of properties in the file can be used to locate and verify the particular image. The first property is the path, which provides the location of the image file, relative to the location of the main metadata file, discussed below. The image width and height are then stored, along with the size of the image on disk, in bytes. Finally, an MD5 checksum is stored, to ensure the data has not been modified since it was captured. These properties may be checked on image load. In addition the XML files are cryptographically signed to prevent modification.

An example plate metadata file is shown below.

Listing 3: An example plate metadata file

```
1  <?xml version="1.0" encoding="UTF-8"?>
2  <metadata>
3    <agar name="blood"/>
4    <growth colonies="0" quadrant="0"/>
5    <organisms>
6      <organism name="agar" label="0" num_colonies="0"/>
7      <organism name="org1" label="1" num_colonies="3"/>
8      <organism name="org2" label="3" num_colonies="10"/>
9      <organism name="org3" label="5" num_colonies="8"/>
10   </organisms>
11   <mask>
12     <image_ref path="Plates/mask_1.png" width="1024"
           height="768" filesize="12345" md5="..."/>
13   </mask>
14 </metadata>
```

As a Petri dish may be split, having two or more different agars in the one culture plate, a dish may have several associated plate metadata files. The metadata stored includes the type of agar, growth information appropriate to the sample type it contains, a list of organism types, which are defined by either the operator or the automatic analysis process. The organism list associates the name of the organism with a label number, providing a way for the labelled images to be interpreted. Finally, a mask for the culture plate is provided, to allow software to read the appropriate section of the labelled image. A single labelled image is used for a single Petri dish, but as a dish may contain multiple agars and therefore multiple plate metadata files, masks are used to determine which labels are associated with which agar.

An example main metadata file is shown below.

Listing 2: An example metadata file

```
1  <?xml version="1.0" encoding="UTF-8"?>
2  <metadata>
3    <plate id="196" type="split"/>
4    <patient id="0"/>
5    <data day="13" month="6" year="2010" time="11:40:58"
          tz="CST" daylightsavings="0"/>
6    <operator name="john_citizen"/>
7    <sample_type name="urine"/>
8    <plates>
9      <plate url="Plates/0.xml"/>
10     <plate url="Plates/1.xml"/>
11   </plates>
12   <diagnosis res-positive/>
13   <notes>-</notes>
14   <plate_loc x="0.5" y="0.5" radius="0.3" angle="-0.04"
          range="3.141593"/>
15   <image url="Images/0.xml"/>
16   <image url="Images/1.xml"/>
17   <labels>
18     <image_ref path="Labels/user_labels.png" width="1024"
           height="768" filesize="12345" md5="..."/>
19   </labels>
20   <computed_labels>
21     <image_ref path="Labels/computed_labels.png" width="1024"
           height="768" filesize="12345" md5="..."/>
22   </computed_labels>
23 </metadata>
```

The metadata stored includes an internal ID of the culture plate, the type of culture plate it is, either whole or split, a patient ID (which is intended to be read from a barcode on the culture plate), the date of capture, the name of the operator who was using the software when the image was captured, the sample type that was placed on the culture plate (e.g. urine or enteric), and a list of references to plate metadata files. A diagnosis for the culture plate is then recorded, whose source can either be the operator or the automatic analysis software. Allowed values for the diagnosis are positive, negative, incubate or inspect. The operator may also enter arbitrary text, which is stored in the notes tag. The location of the culture plate is stored in a relative format. To obtain the pixel location of the culture plate, the x and y coordinates must be multiplied by the image width, w, and height, h, respectively. The radius must be multiplied by $\sqrt{w^2+h^2}$. Each of the images that are attached to the culture plate are then referenced via their image metadata files. The labelled images are also referenced via the path to their PNG files. The main metadata file may also include a reference to the computed labels, but this is optional.

To ensure consistency in labelling, a biology database may also be used, that lists acceptable values for the agar, sample and organism types of a particular metadata instance. The precise contents of the database are dependent on the laboratory where the system is deployed. The biology database is organised first by sample type, then by agar type. Each agar type then contains a list of valid organisms. Every entry in the database contains at least three fields: A name, a short description and a description. The name is used whenever a machine-readable name for the entity is required and acts as a key into the database. The short description is intended for use within a GUI in places where such text is appropriate, such as in menus or other user interface elements. The description can be arbitrarily long and is the full, technical name for a particular entity.

Image Capture

FIG. 1 shows an embodiment of an apparatus 100 for use in analysing microbial growth on a medium in a culture plate 102 in the form of an agar plate. The apparatus 100 includes the following components:

- An image capture device 104 in the form of a high resolution digital camera 106 of machine vision quality with an appropriate fixed focal length lens, 108. The camera 106 is positioned about 200 mm above a ring light 110.
- The ring light 110 has a large diameter relative to the diameter of the culture plate 102. In this example, the ring light has a diameter of 180 mm. The ring light 110 contains several hundred white LEDs arranged in a circular array and a diffuser. This light provides low angle, diffused side lighting to enable the culture plate to be uniformly illuminated. The ring light 110 is positioned around 40 mm above an opaque cover 112 that forms part of the frame 118, and thus about 30 mm above the culture plate 102. The positioning of the ring light 110 so that light from the white LEDs impinge on the surface of the culture plate 102 at a low angle prevents a specular reflection of the LEDs from a central surface of the medium being captured by the image capture device 104.
- A lighting device 114 in the form of a flat panel light based on an array of white LEDs behind a diffuser. The lighting device 114 is located about 150 mm below the opaque cover 112. This distance is chosen so that light from the ring light 110 falls on the baffles rather than the light 114, to reduce rear illumination of the culture plate 102.
- A support 116 for supporting the culture plate 102 in the direct field of view of the image capture device 104. The support 116 is a transparent glass stage that is 3 mm thick. The glass may be replaced if it becomes scratched over time. The support 116 includes two or more triangle shaped transparent positioning elements for positioning the culture plate 102 on the support. The apexes of the triangles point towards the centre of the support for placement of the culture plate 102 so that the apexes touch the circumference of the culture plate 102.
- A frame 118 positions the image capture device 104, support 116, ring light 110 and lighting device 114 relative to each other. The frame 118 is made of an opaque material, such as sheet metal or plastic, which reduces the amount of light entering the apparatus 100. The internal surfaces of the apparatus 100 are blackened where possible to reduce reflection of light from the internal surfaces into the lens 108.
- The frame 118 includes a door 120 providing an access patch for a human operator to place the culture plate 102 on the support 116. Alternatively, a robotic plate-handling device may use the access path to place the culture plate 102 precisely on the support 116 for imaging, and then to remove the culture plate to a designated output channel/slide. For example, the culture plate may be placed in an output channel representing one of the up to four categories described above.
- The opaque cover 112 is an aluminium plate that extends across the width of the frame 118 and effectively splits the frame 118 into a top enclosure 122 and bottom enclosure 124. The opaque cover 112 includes a hole 126 to allow light from the lighting device 114 to transmit through to the culture plate 102. The width of the hole 126 is just slightly larger than the width of the culture plate 102 (which is 90 mm in this example and is typically between 88 and 100 mm) and is less than the diameter of the ring light 110. This prevents light emitted from the ring light 110 from reflecting from the bottom surface 128 of the frame 118 or the surface of the flat panel light 114 and back through the culture plate 102.
- The frame 118 also includes light baffles 130 positioned below the opaque cover 112.
- Means 131 for changing the position of the ring light 110 relative to the support 116 are also provided in the form of a rack and pinion assembly.
- The frame 118, opaque cover 112 and light baffles 130 define a cavity 132 such that the support 116 supports the culture plate 102 between the image capture device 104 and the cavity 132. The support (glass stage) 116 seals the cavity 132 and prevents unwanted material from falling into the cavity 132. When the ring light 110 is illuminated and the lighting device 114 is off, the opaque cover 112 prevents light from the ring light 110 from illuminating visible areas of the cavity 132. In this configuration, the cavity 132 looks like a black background.
- A side angle light 134 is used to illuminate the culture plate 102 from an angle to highlight any surface topography on the agar, such as dimples or a granular texture. An alternative to the side angle light 134 is to activate only some of the LEDs in the ring light 110, such that the culture plate 102 is illuminated from one direction only.
- A processing means such as a computer 136 is connected to the image capture device 104, the ring light 110 and the lighting device 114 via a physical or wireless interface. The computer 136 may include a processor 138 and memory 140 storing software 142 for activating the different components, capturing raw data and processing the data.
- A library of images, metadata and other information may be stored at the computer 136, or may be accessible at the computer 136 via a network. Similarly, the LIMS may be accessed via the computer 136.

It will be appreciated that different components may be substituted for any of the above described components of the device, and that the distance between components and position of components may be adjusted. For example, although the camera 106 and lens 108 are shown inside the frame 118, in another example, they could be positioned outside the frame 118, with the lens 108 protruding through a hole in the top surface of the frame 118. Also, the width of the frame 118 could be decreased to reduce the overall size of the apparatus 100.

An image acquisition process using the apparatus 100 will now be described. This process may be suitable for obtaining images for use in classifying microbial growth on the culture plate 102 using a trained machine learning classifier, or in training such a classifier. A manual process will be described, where many steps are performed by a human operator, but it will be appreciated that many of the steps of the process may be automated and performed in software or by a robotic device.

Firstly, an inoculated and incubated culture plate 102 is positioned on the support 116, within the triangular stops, by a user. Culture plates 102 are generally stored within a laboratory with the agar facing down (to prevent condensation on the lid from falling on to, and damaging, the agar surface), so positioning the culture plate 102 on the support may include removing a lid of the culture plate 102 and rotating the culture plate so that the agar is facing upwards.

The software 142 is activated to begin the image capture process. The software 142 requires the user to scan a barcode on the culture plate 102, or enter a number manually. The barcode links to a sample ID, which links the culture plate to a particular sample and, via a LIM system, to a particular patient. Once the barcode has been entered, a live video preview of the camera output appears in the window shown in FIG. 2(*a*). The user may adjust the location of the culture plate 102 or the focus or aperture of the lens 108, based on the feedback provided by the live video stream.

The user is then required to select the culture plate type (e.g. split or whole), sample type (e.g. urinary, enteric, blood or tissue) and agar type(s) (e.g. blood or chromogenic). An example of a plate data selection options is shown in FIG. 2(*b*) and at the top left of FIG. 2(*a*). In an alternative, rather than requiring the user to select the culture plate, sample and agar type, this information could be extracted from the LIM system, based on the barcode entered.

Figure 3:
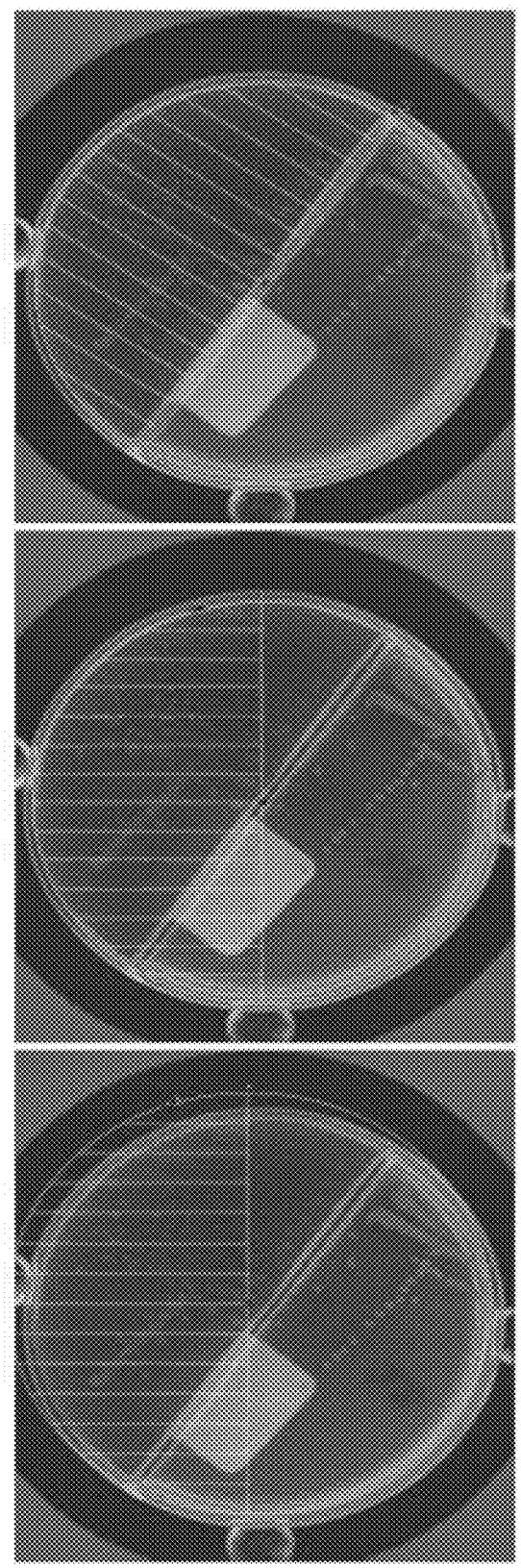
FIG. 3 is a series of screen shots showing a GUI for entering the position of a culture plate in an image.

After this data has been entered, the culture plate position is entered. There are two ways that this information can be entered by the user. The first is through a traditional set of sliders, which allow entry of the x, y location of the dish, along with its radius. If the dish is a split dish, the user must also enter the location of the split. An example of this is shown in FIG. 2(*c*) and the bottom left of FIG. 2(*a*). The second method is through manipulating a set of markers over the live video preview. The user places the circle around the agar via three points, which the user is able to move interactively. These three points uniquely define a circle. A fourth control point allows the user to specify the location of the central split, if appropriate. Such control points are quick and easy to place very accurately. FIG. 3 shows an example of how such an interaction might occur. In a system with a robotic culture plate placement, the location of the culture plate will be known, and the location of the split can be computed.

The exposure and light settings may be drawn from a database on the basis of the culture plate, sample and agar type(s) selected.

Correct exposure is important to good quality image capture. During testing of the camera 106, it was determined that separate exposures are required for each side of a split culture plate, owing to the different opacities of the different types of agars they may contain. The choice of lighting will also heavily influence the required exposure settings, so the user is also able to preview the image in any available configuration, with top or bottom lights activated. FIG. 2(*d*) shows radio buttons that may be used to select either the top light or bottom light to activate. Although not shown, the user may alternatively choose the side angle light to activate.

The exposure settings may be adjustable by the user, for example using a range of automatic exposure algorithms that may be selected using a drop down menu such as shown in FIG. 3(*e*). Each of the automatic exposure algorithms has the same core. Given a target brightness, $b_{tgt}$, and a measured brightness, $b_{meas}$, the new exposure, $e_{new}$, is calculated as:

$$\alpha = \frac{b_{tgt}}{b_{meas}}$$

$$e_{new} = \begin{cases} 0.8 e_{old} & \text{if } b_{meas} > 1 \\ 0.5 e_{old} & \text{if } \alpha < 0.5 \\ 2 e_{old} & \text{if } \alpha > 2 \\ \alpha e_{old} & \text{otherwise} \end{cases}$$

In other words, if the brightness is too high (the image is saturated), unconditionally drop the exposure to 80% of its previous value. If this is not the case, the change is then clamped to be between 0.5 and 2. The adjustment stops if two successive exposure settings are within 10 microseconds of each other. Both brightness measures are typically represented as a number between zero and one, where zero is black (no brightness) and one is white (full brightness).

The difference between the various automatic exposure algorithms is in how they compute the brightness of the current image. Different algorithms that may be used include:

Mean—In this mode, the mean brightness of all pixels in the image is computed.

Centre-Weighted Mean —Centre-weighted mean computes the mean brightness of all pixels, but gives those pixels within $\sqrt{8} \times r$ of the centre additional weight (each centre sample is counted 8 times).

Spot—This method again computes a mean brightness, but only of those pixels within $\sqrt{20}\%$ of the centre. This method is not as appropriate for agar plates, since the centre spot has no special meaning.

Median—This method computes the median brightness across the image via a histogram calculation. Each bin of the histogram is 4 levels wide, hence if the input images are 16-bits the histogram has 16384 bins. The true bit-depth of the images could also be read from the camera and provided to the algorithm.

Green—This method is the same as Mean, but uses the green channel alone to compute the brightness. This is advantageous for two reasons. First, there are twice as many true green pixels in a Bayer mosaiced image as red or blue. Second, the human eye is sensitive to green, so using it to adjust the images should provide a conceptually high quality image.

The software 142 may further include processes for assisting the user to select good exposure settings, for example, by pulsating pixels between their normal colour and red. This helps to identify overexposed, or saturated, pixels, which can be rectified by reducing the target image brightness.

Initial exposure settings are loaded from the database and adjusted prior to each capture using one of the algorithms described previously. Once the exposure settings are finalised for a given lighting configuration, image capture is performed using a method shown in FIG. 4. At step 164, capture is initiated, at step 166 the lighting configuration (e.g. the ring light 110) is activated. The image is captured at step 168 by image capture device 104 using this lighting configuration. Image capture is repeated a number of times for each culture plate, each time having the same exposure (step 170). Each of these images is averaged together during the processing stage to reduce image noise. A sequence of five images is sufficient. The process is repeated for the other side of the culture plate in the case of a split culture plate (step 172) and for other lighting configurations, e.g. for the bottom lighting device 114 (step 174). At step 176, the captured images are handed off for data processing and then image capture is complete (step 178). As an example, capturing an image of a split culture plate may require 5×2×2=20 images, which would take around 2 seconds, assuming that the camera 106 operates at 9 frames per second.

Once the images have been captured, they may be handed off to a separate thread of execution for asynchronous processing. The capture window then reverts to waiting for a barcode to be entered. Each time a culture plate image is captured, the image, along with any salient metadata is saved in the library.

It will be appreciated that although in the software described above, a user is required to position the culture plate and enter metadata, this process could be automated. For example, a robotic arm may place the culture plate on the support before image capture and remove it after image capture. The software could automatically detect the position of the culture plate in the image and whether it is split or whole. A robotic system may be used to read an identifier or barcode on the culture plate. The barcode or other identifier may enable access to information such as culture plate type, sample type and agar type so that this information does not need to be entered by the user. In a version of the software aimed at fully automatic processing, the user would not adjust the exposure or target brightness settings.

Image Processing

Once the images have been captured with good exposure, the raw data from the image capture device is processed to obtain a more accurate image for the sample that can be used to generate feature images for use in the boosting algorithm for generating the boosted classifier. It will be appreciated that although this embodiment describes the use of a boosted algorithm, the classifier could alternatively be generated using a different technique.

Figures 4, 5:
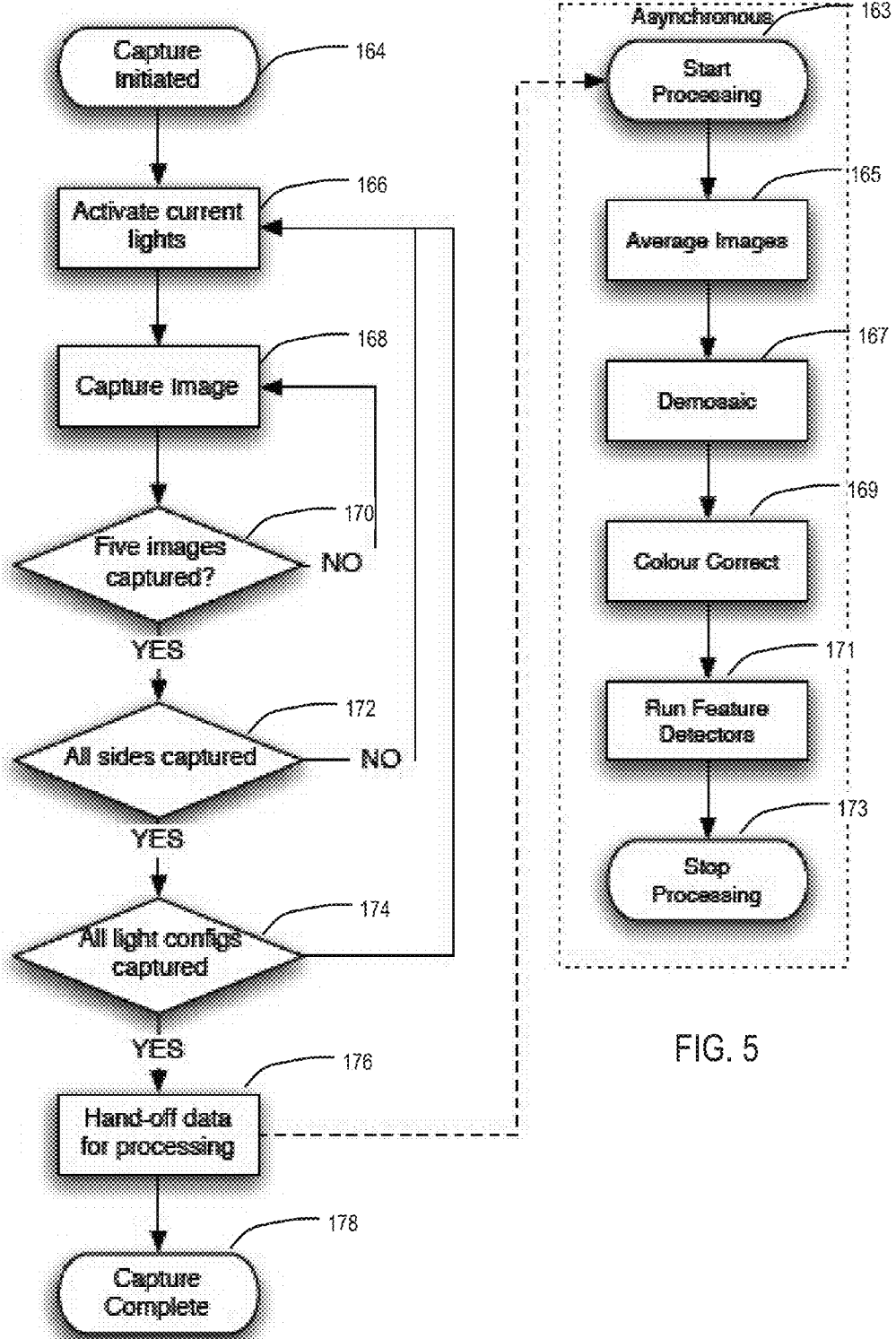
FIG. 4 is a flow chart showing a method for capturing an image of a solid culture medium and any microbial growth thereon.
FIG. 5 is a flow chart showing a method for processing the captured image.

With reference to the method shown in FIG. 5, the image processing starts at step 163, and includes at step 165 averaging the images taken by the image capture device, at step 167 demosaicing the averaged images, at step 169 colour correcting the resulting image, at step 171 computing the feature vectors and at step 173 stopping the processing.

The images are averaged to combine the five (or other number) of images taken at the same exposures into a single overall image. The use of five averaged images reduces the effects of noise.

Demosaicing is performed because most cameras have sensors that can measure only one colour at each physical location, for example using a Bayer arrangement of colour filters. This means the raw data from the camera is a mosaiced pattern of individual red, green and blue pixels. Suitable methods of demosaicing include:

Nearest Neighbour—Nearest neighbour is a simple method that produces fast, low quality results. In this method, each 2×2 block is processed together. The red and blue values are copied from their original location to the three other pixels missing that respective value. The green values can then be copied either vertically or horizontally. This results in each 2×2 block having all channels filled in at all locations.

Downsampling—The downsampling method produces arguably the best results at the expense of resolution. In this method, each 2×2 block is collapsed into a single pixel. The two green values are averaged and the red and blue values are simply assigned. This method requires no interpolation and hence is the most faithful to the original pixel data.

Adaptive-Homogeneity-Directed demosaicing (AHD)—This algorithm has found to be most suitable. Details of the AHD process can be found in K. Hirakawa and T. W. Parks. "*Adaptive homogeneity-directed demosaicing algorithm*" *ICIP,* 2003, the contents of which are herein incorporated by reference. In essence, AHD proceeds by vertically and horizontally interpolating the green channel to produce two images. Each of these then has a red and blue channel added by smoothing the difference between the red and green channels and the blue and green channels. Finally, the two images are combined by identifying homogeneous regions and selecting the most appropriate image to draw pixels from at each point. This process results in a very high quality result.

Colour correction of the image involves correcting for white balance and brightness, and using a pre-calculated mapping to map apparent colour of the averaged image to true colour. White balance and colour correction are beneficial for ensuring accurate determination of agar and colony colour(s), which is important for speciation and the detection of phenomenon such as fermentation and haemolysis. Hence high quality colour calibration is important.

Figure 6:
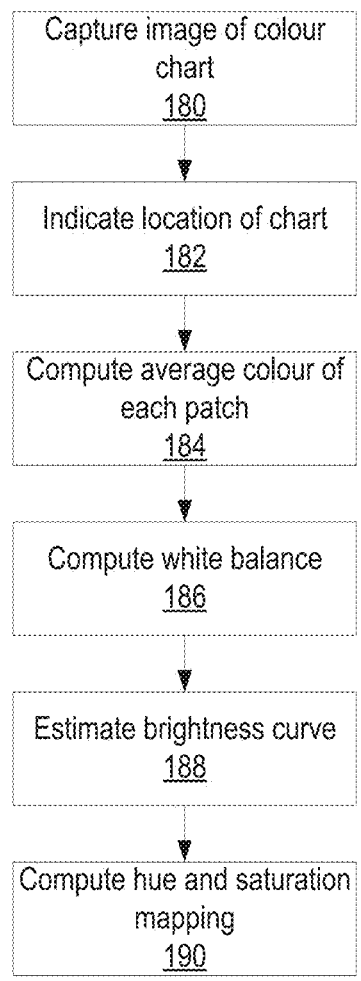
FIG. 6 is a flow chart illustrating a method for estimating a mapping from apparent colour to actual colour.

The white balance and colour correction parameters used to correct the image are specific to the image capture device and lighting arrangement and are pre-calculated using a colour chart. With reference to FIG. 6(a), at step 180, an image of a reference colour chart is captured. The chart may be a standard "gretagmacbeth ColorChecker™Color Rendition Chart", which has 24 colour patches, each of which has an associated reference red, green and blue channel value. The image may be captured by activating the camera 106 manually or via electronic signals sent using the software 142. The data captured by the camera sensors is transmitted via the physical or wireless connection to the computer 36, with colour calibration disabled.

At step 182, the user indicates the location of each colour patch in the reference colour chart. For example, the software could cause a GUI to display a preview of the image from the camera 106, and the user may click in the four corner squares of the chart in a specific order to enable the locations of the colour patches to be determined. In other alternatives, the location of the patches may be determined using a different user interface, machine vision techniques or by the placing of the reference colour chart in a specific known location that is a fixed distance from the camera.

The average colour of each location is captured in a 21×21 pixel window and used for the patch colour at step 184. Of course, it will be appreciated that different sized pixel windows could be used to compute the average colour.

At step 186, the white balance is computed from a single patch—namely the third darkest grey patch in the reference colour chart. It is assumed that the R, G and B values are equal in this neutral grey patch. The white balance is represented as:

$$\begin{bmatrix} r' \\ g' \\ b' \end{bmatrix} = \begin{bmatrix} w_r r \\ g \\ w_b b \end{bmatrix}$$

where $w_g$ is implicitly defined as one. The weightings $w_r$ and $w_b$ are calculated to produce r' and b' values equal to the g' value. The computed white balance values $w=[w_r, 1, w_b]$ will be used to correct the white balance of images captured by the camera.

Figure 7:
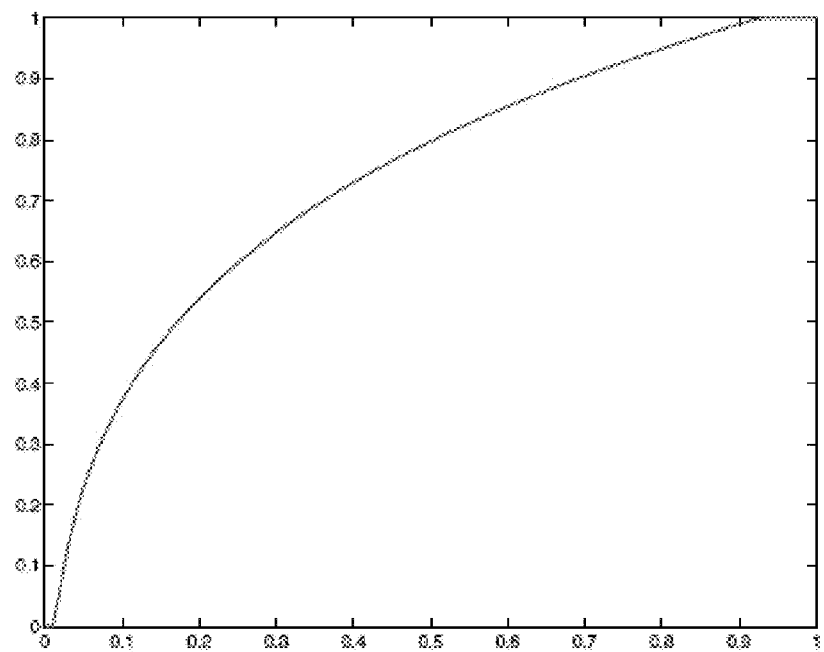
FIG. 7 is a graph showing an example curve for correcting the brightness of a captured image.

Once the white balance has been computed, at step 188, a curve C is computed which maps the apparent grey colour values together as well as possible. This provides a brightness mapping for the camera. The form of the curve is: $g'=ag^b+c$ where g is the input colour, g' is the output and a, b and c are the parameters of the curve C that are computed. FIG. 7 shows an example curve obtained from this process. Once estimated, the curve may be applied independently per colour channel. The final stage of the colour mapping function (step 190) aims to produce a mapping for the hue and saturation of each pixel.

The apparent hue and saturation of a plurality of the colour patches are measured, based on the white balance and colour corrected image and a hue and saturation mapping is computed at step 190. The hue mapping is provided using a series of control points to map the apparent hue values to actual hue values. It uses cubic interpolation (or another higher order interpolation method) to achieve this. Each control point consists of a position in a circular hue space, which is fixed, and an angular offset, which is computed during optimisation. The offset is cubically interpolated to provide an offset for a particular hue value that will map the particular hue value to an actual hue.

The saturation mapping function uses a series of control points to scale saturation values. These control points may be the same or different from the control points used to map the hue values. The saturation mapping function may use the same interpolation scheme as the hue mapping function. Note that saturation must be in the range [0, 1] and hence the output value from this function is clamped to ensure this range is enforced. In an alternative, the saturation mapping may be done via a curve similar to that applied for brightness correction.

Figure 8:
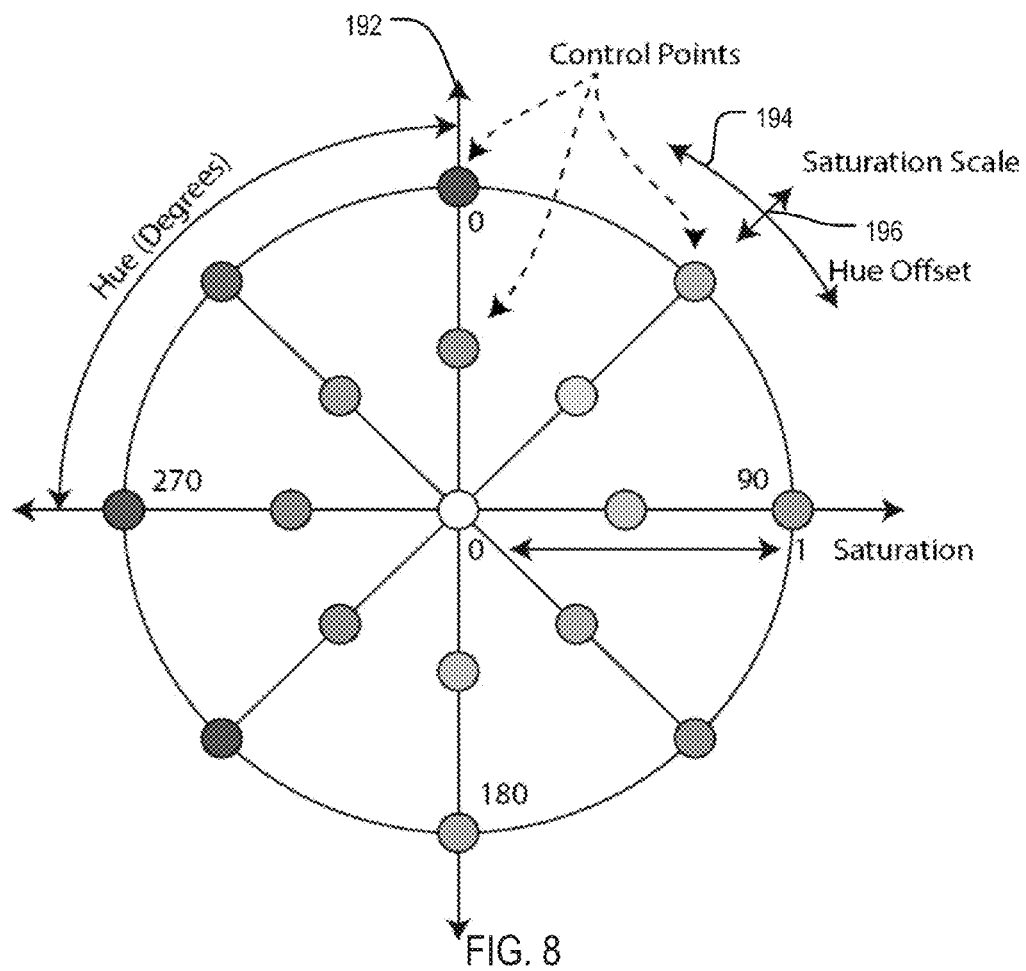
FIG. 8 is a diagram of a HSV space showing a plurality of control points within a circular hue space.

The control points used in the hue and saturation mapping functions may be spread evenly around the edge of the circular hue space as shown in FIG. 8. This circular hue space includes 16 control points, represented by coloured circles (for example, control point 192). For example, the coloured circle at hue of 0 degrees and saturation of 1 may be red, at hue of 90 degrees and saturation of 1 may be green, at hue of 180 degrees and saturation of 1 may be blue and at hue of 270 degrees and saturation of 1 may be purple. The direction of angular offset 194 and scale 196 is also shown in FIG. 4. The angular position of the control points are defined by their hue value and the radial position of the control points are defined by their saturation. Two rings of control points are shown, an inner ring having saturation of 0.5 and an outer ring having saturation of 1. In the case of a single ring of control points, only a single value is required to select the appropriate point, the value corresponding to hue. Hue is expressed as an angle and the function must take account of this when selecting control points.

The maximum number of control points is defined by the number of colour samples available. Each control point has two parameters, and each sample provides three residuals. Hence, n colour samples can have at most 3n/2 control points. In practice, however, the measurement process induces errors in the colour measurements. Selecting the control points may include computing an error for a series of candidate mappings using different numbers of control points, and selecting a mapping from the series based on the minimal number of points yielding an acceptable error. It has been found that 12 control points are sufficient for a chart with 24 patches.

Since the brightness curve has already been estimated, it is assumed that the brightness values are correct, hence they need not be adjusted. The angular offsets and scales are optimised to best map the apparent colours of patches from the image onto the actual colours of the equivalent colour patches in the reference colour chart.

This is done by calculating a mapping f (p), such that the distance between the true and mapped colours is minimised:

$$\epsilon = \sum_i \|p_i - f(\hat{p}_i)\|^2$$

where $p_i$ is a true colour and $\hat{p}_i$ is a measured colour. The colour may be represented in any colour space, for example RGB, YUV, LAB or XYZ.

The cost function includes terms which ensure the scales maintain a value around one and the offsets around zero to prevent very large changes (such as offsets larger than 360°). Given the following error measure:

$$\epsilon = [p_1 - f(\hat{p}_1), \ldots, p_N - f(\hat{p}_N), \delta_1, \ldots, \delta_M, 1-s_1, \ldots, 1-s_M]$$

where $\delta_i$ is the offset for the control point and $s_i$ is the scale for control point. It is sought to select $\delta_i$ and $s_i$ to minimise $\epsilon$ ie $$\operatorname{argmin}_{\delta_i, \ldots, \delta_M, s_1, \ldots, s_M} \|\epsilon\|^2$$

A solution to this equation may be obtained using the Levenberg-Marquardt algorithm, though any other unconstrained minimiser would also suffice. The cost function tries to minimise the error in mapping the colours together, while keeping the hue offsets near zero and the saturation scales near one.

In summary, an angular offset 194 and scale 196 is determined for each control point so that the sum of squares of the distance between each transformed apparent colour (e.g. RGB) and the reference colour (e.g. RGB) for each patch is minimised whilst holding the angular offset near zero and the scale close to one (minimises 1 minus the scale).

Figure 9:
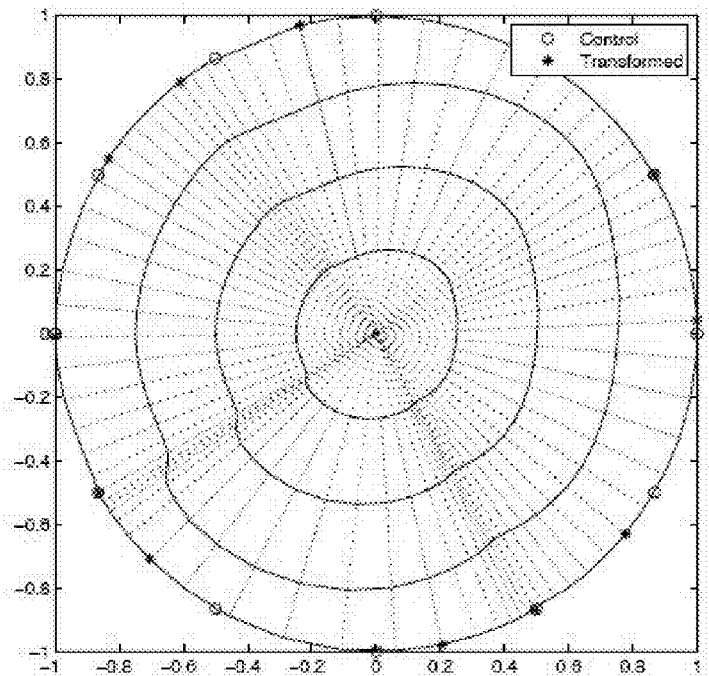
FIG. 9 is a graphical representation of (a) the mapping across the hue/saturation space, (b) the isolated hue mapping function and (c) the isolated saturation mapping function for a particular image capture device.
Figure 9:
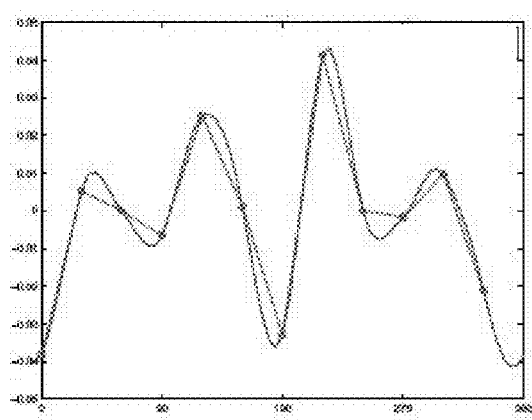
Figure 9:
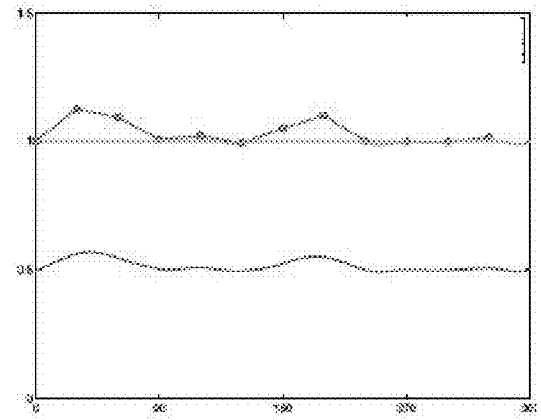
Figure 10:
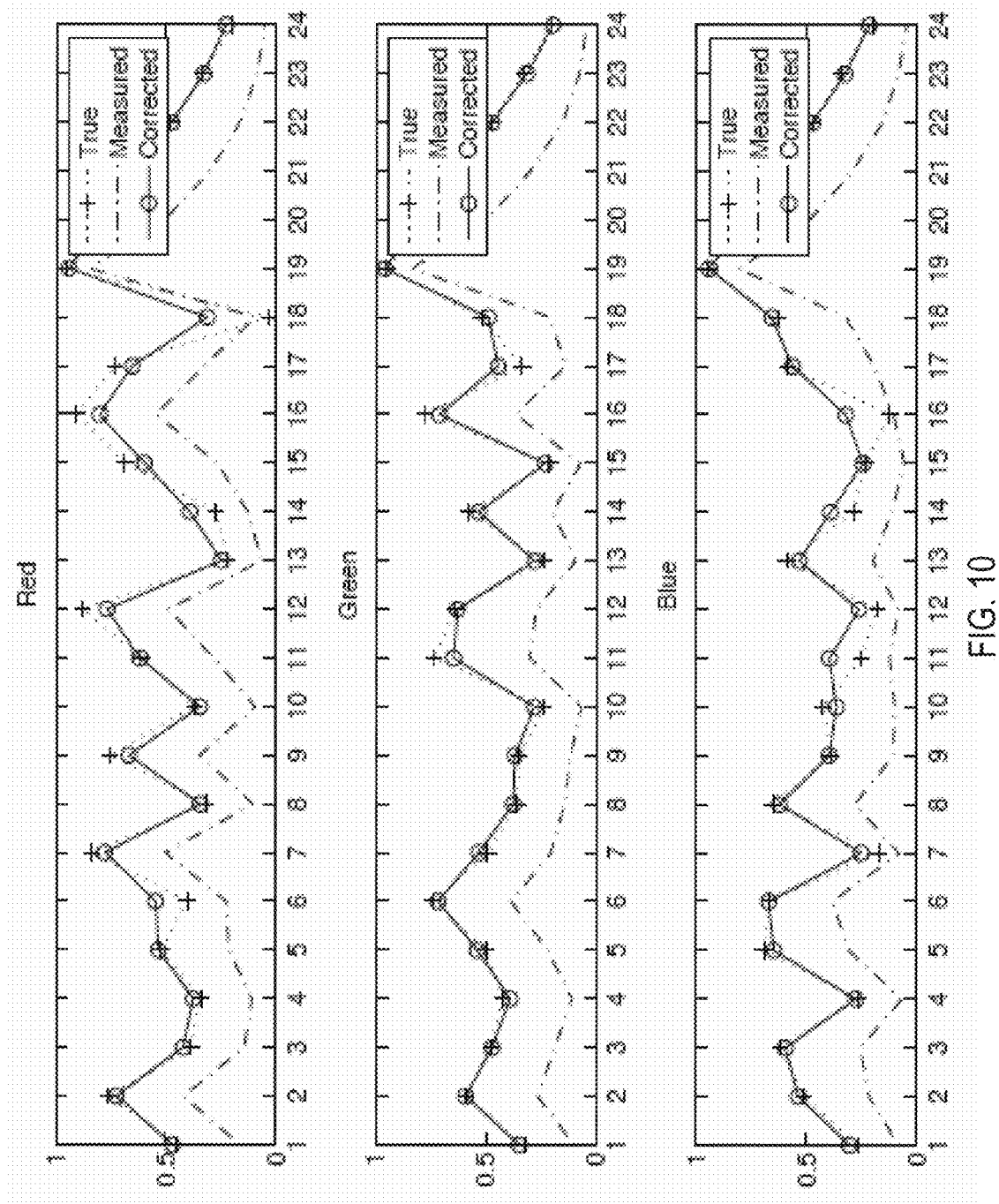
FIG. 10 is a graph showing the accuracy of the mapping.
Figure 11:
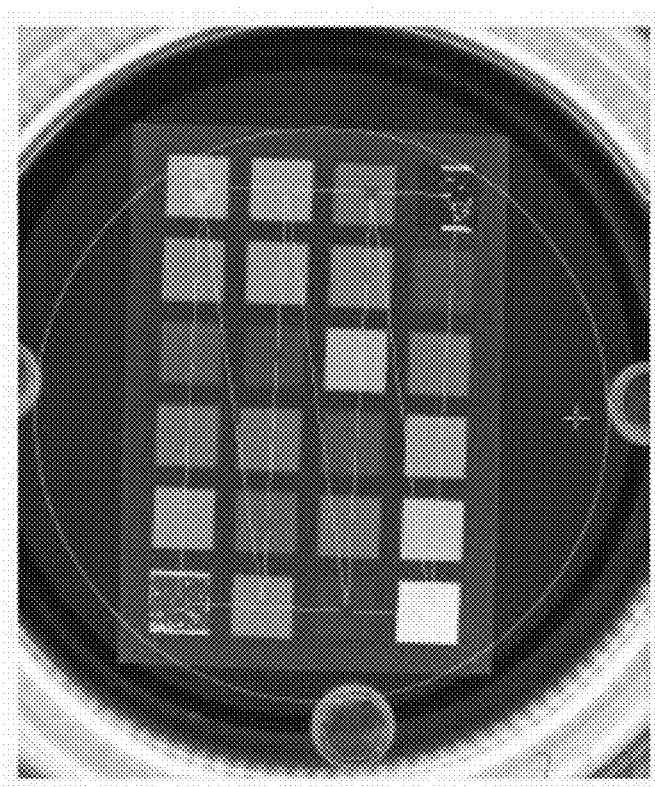
FIG. 11 is two photos of a colour chart (a) before colour calibration and (b) after colour calibration.
Figure 11:
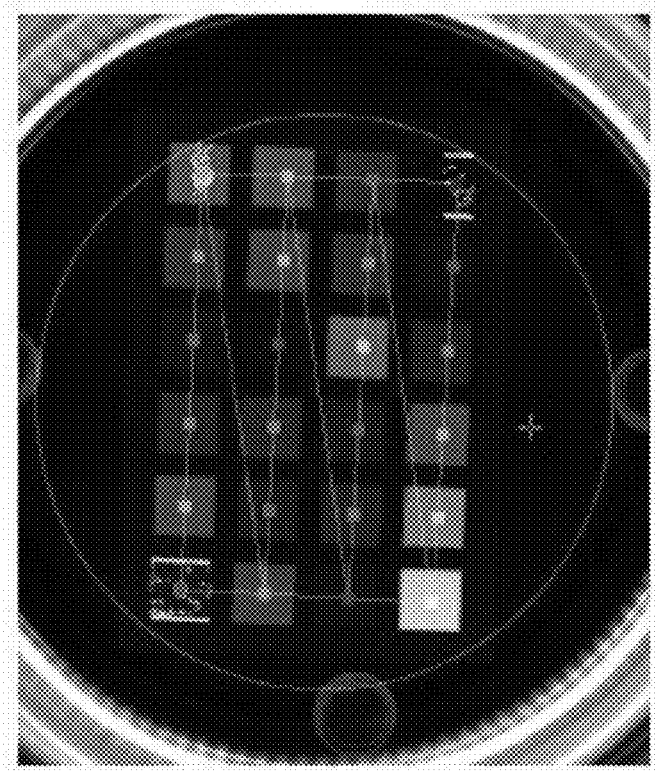

FIG. 9 shows a graphical representation of (a) the mapping across the hue/saturation space, (b) the isolated hue mapping function and (c) the isolated saturation mapping function for a particular camera. FIG. 10 provides some details on the accuracy of the mapping. Each position on the y-axis represents one of the 24 colour patches and the x-axis represents the colour values, where each can be between zero and one. An example of colour correcting an image using the mapping is shown in FIG. 11. The first image (a) shows the input image, as captured by the camera, after the user has selected the position of the colour patches. Note that in this example, the white balance is already roughly correct. The second image (b) shows the corrected colours. The small coloured squares visible over the patches show the true colour of each patch.

Figure 12:
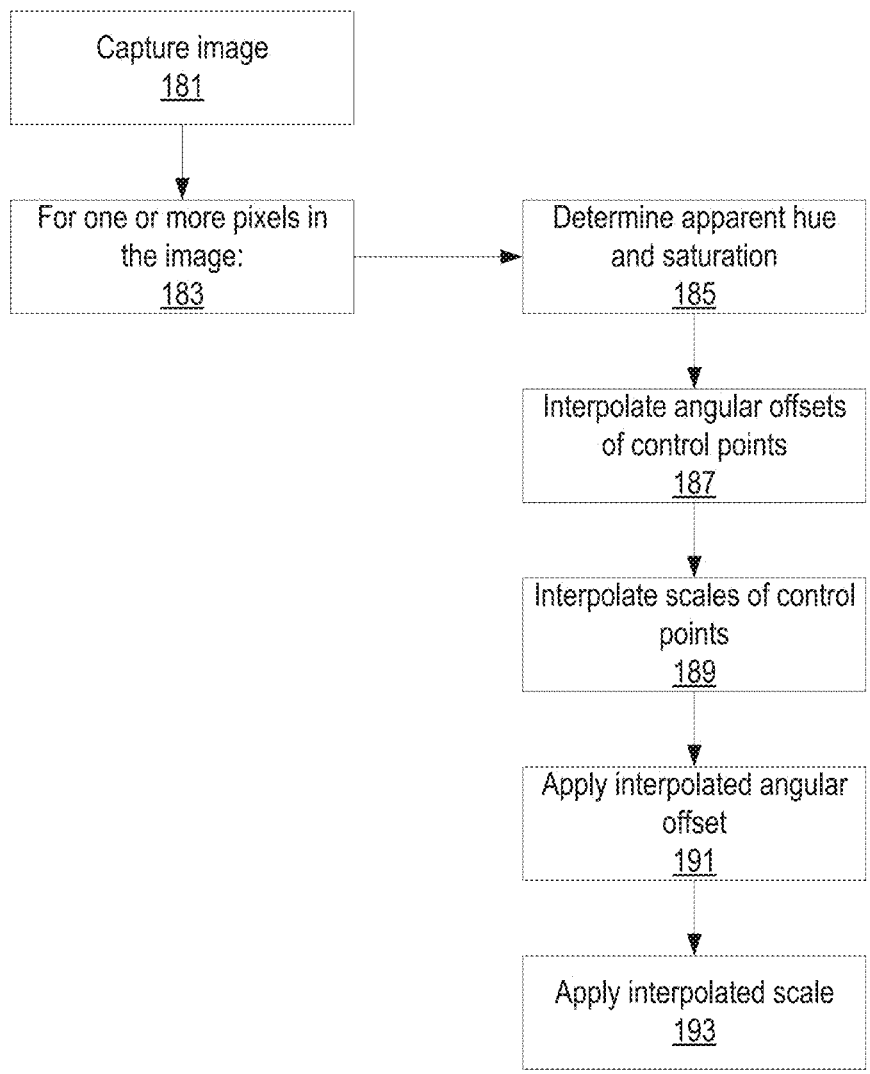
FIG. 12 is a flow chart illustrating a method for mapping an apparent colour to an actual colour.

This mapping can then be used to colour correct an image captured using the same (or the same type of) image capture device. With reference to FIG. 12, a method for mapping an apparent colour to an actual colour includes at step 181 capturing an image using the camera. The apparent RGB colour values for each pixel may be determined and the colour values may be white balance and brightness corrected using the weights/curve previously computed. The method then involves at step 183 for one or more pixels in the image determining the apparent hue and saturation of the pixel (step 185), interpolating between the angular offsets of two or more control points in the circular hue space to determine an angular offset associated with the apparent hue (step 187), interpolating between the scales of the two or more control points in the circular hue space to determine a scale associated with the apparent saturation (step 189), applying the angular offset to the apparent hue (step 191), and applying the scale to the apparent saturation (step 193).

Once the mapping has been applied, the HSV space colour can be transformed back into the RGB space, or to any other output space as desired.

A linear method may also be substituted for the HSV method, where the colours are mapped via:

$$T_{3\times 3} \begin{bmatrix} w_r r^\gamma + c_r \\ g^\gamma + c_g \\ w_b b^\gamma + c_b \end{bmatrix}$$

where T is a 3×3 transformation matrix and the remaining variables are scalars.

Figure 13:
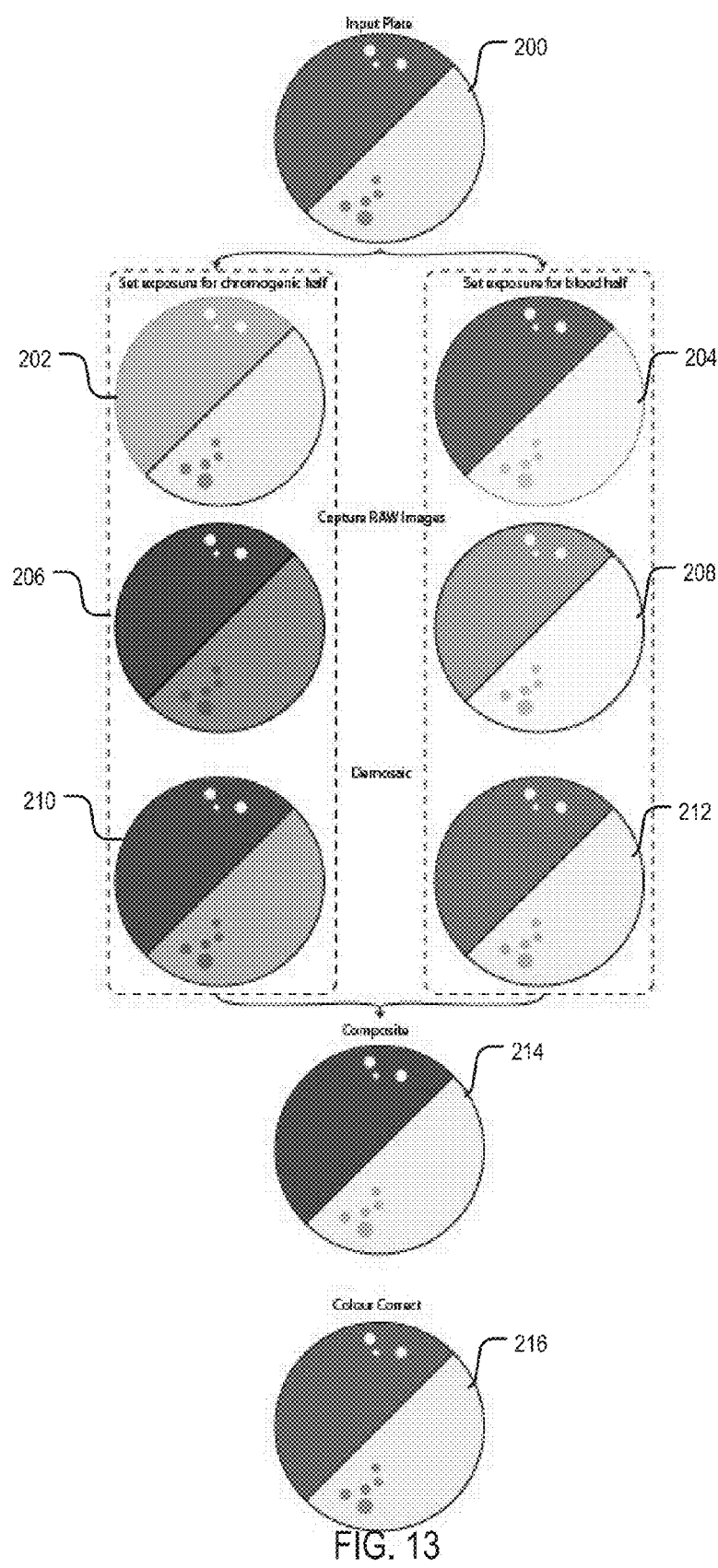
FIG. 13 is a flow diagram showing the image capture pipeline run on a split culture plate.

FIG. 13 shows the overall image capture pipeline for a split culture plate having half blood agar and half chromogenic agar. The pipeline runs twice, once for each lighting configuration (top light illuminated and bottom light illuminated). The pipeline also has two branches, to capture images of each side of the culture plate separately, each branch being optimised for the type of agar. Given an input culture plate 200, the exposure is set for the chromogenic 202 or blood 204 half, then the raw images 206, 208 from the camera are captured and demosaiced 210, 212 to produce two distinct RGB images. The relevant halves of the demosaiced images are stitched together to form a composite image 214 which is colour corrected 216. In an alternative, the raw images may be composited together, and the composited image demosaiced, reducing the computation required.

Once the images have been averaged, demosaiced and colour calibrated, the result is image data for a medium. The same process of capturing and processing images may be used to obtain image data for training the classifier, and image data for classifying a culture plate.

Image Labelling

For the purposes of training the classifier, the image data is labelled by an experienced microbiologist. This may be done off-site and away from the imaging and lighting apparatus. Labelling is the process of providing correct labels for the image data for a particular culture plate. The choice of labels may be different for different agar and bacteria types of interest. At the time of labelling, the operator may also check the metadata for the culture plate to ensure that it is correct.

The labelling may be done via simple drawing tools, typical of any painting software. The labelling program may load metadata associated with a particular image, and use that to determine what organisms are applicable to a particular culture plate. The user may then select which side of the culture plate they wish to label, if it is a split culture plate, which may change the set of available organisms. In an embodiment, having chosen an organism to paint, the user has three main tools available for painting: A brush tool, a fill tool and an eraser. The brush tool is a variable sized circular brush. The fill tool performs flood fill from the point under the cursor. It fills contiguous regions of background or a particular label colour, depending on what was under the cursor when clicked. The eraser functions the same as the brush tool, but writes the 'unknown' label rather than an organism label.

Other tools may be available to the user as well: an eye dropper, an inspector and a plate location tool. The eye dropper is used to change the currently selected organism to the one under the cursor. It also sets the window status to the name of the organism under the cursor, when moving the mouse around on the screen. The inspector sets the window status to the current colour under the cursor and position in pixels of the cursor on the image. It also highlights any organisms under the cursor and provides their size in pixels. The plate location tool is the same as the tool in the capture window, and is used to adjust the position of the culture plate in the image.

When the microbiologist selects an area in the image data to be given a particular label, each pixel within the selected area is assigned that label. The labelled image data is stored in the library, together with metadata extracted from the labels.

Training

Using the user-supplied labels for an image set and feature vectors (to be described below), a boosted decision tree classifier is trained to distinguish between the plate itself and bacterial growth, and between different types of growth.

Figure 14:
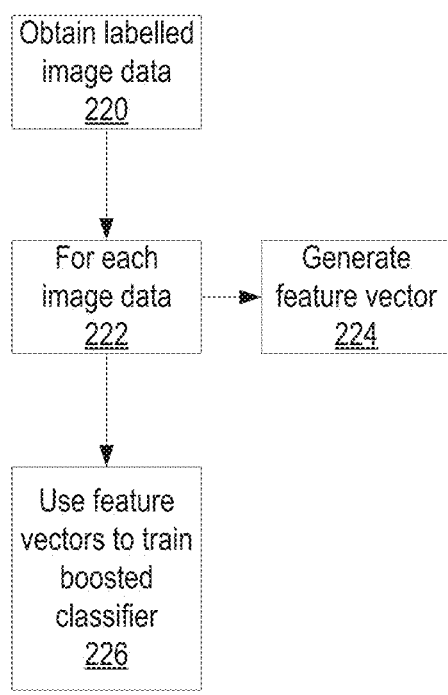
FIG. 14 is a flow chart showing a method for training a classifier for use in analysing microbial growth on a solid culture medium.

Referring to FIG. 14, a method for training the classifier includes at step 220, obtaining labelled image data for a plurality of samples of microbial growth, at step 222, for each labelled image data: for a plurality of pixels in the image data, generating a feature vector of values obtained by applying one or more filters to the image data (at step 224), and at step 226, using the feature vectors to train a boosted classifier to classify each pixel in the plurality of pixels according to a label associated with the pixel in the labelled image data.

Figure 15:
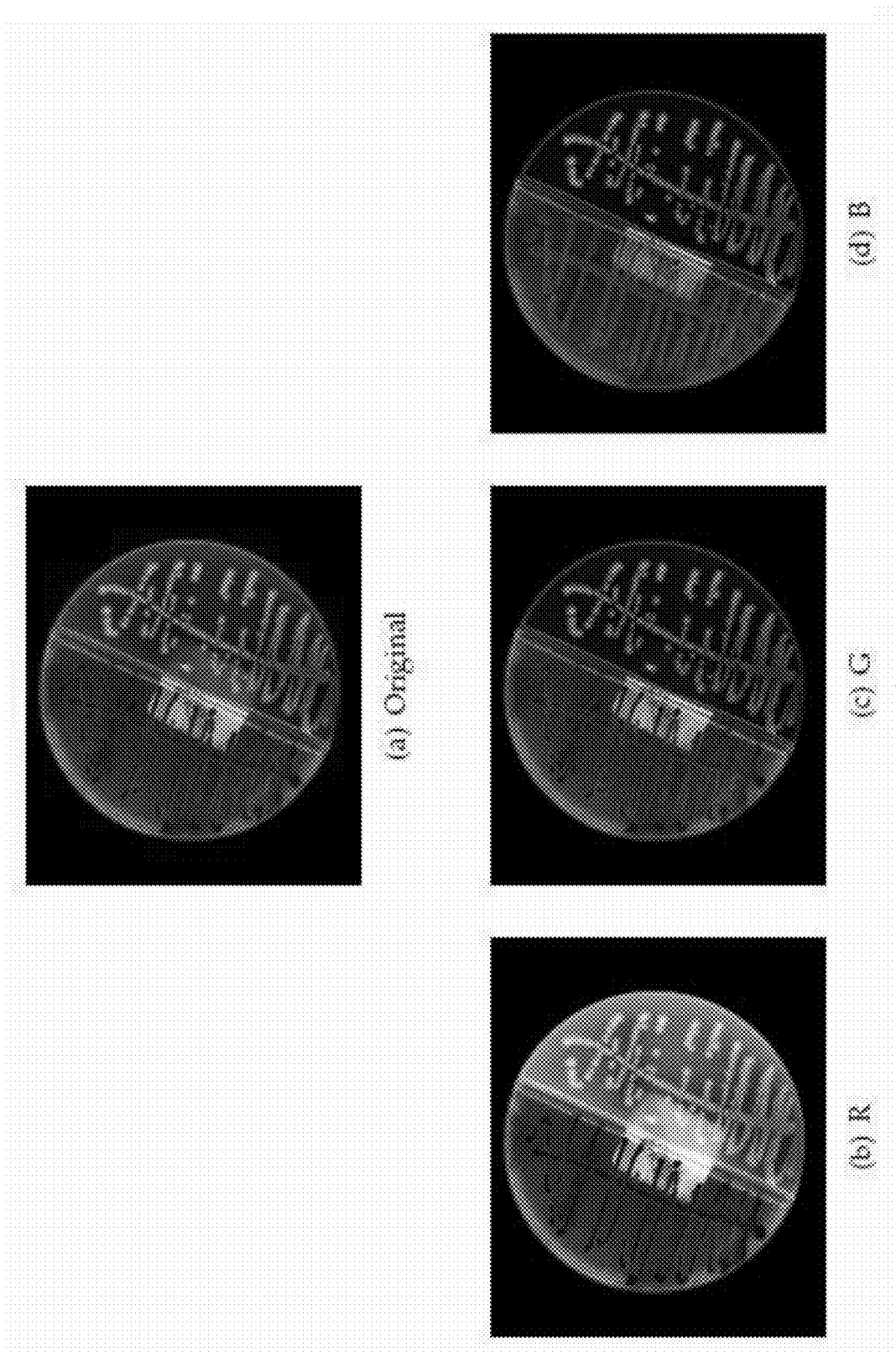
FIG. 15 is a series of representations of (a) image data for microbial growth on a solid culture medium, (b) a red channel feature image, (c) a green channel feature image and (d) a blue channel feature image.

The one or more filters are applied to transform the image data and extract information which can be used to train the classifier, allowing it to learn the distinctive features of each type of bacterial growth. The filters extract information on the colour and texture of the culture plate at and around each pixel. The output of the filters may be a set of feature images. Some examples of filters and their resulting feature images are given below:

RGB filter—Some growth types can be easily distinguished by their colour. The RGB filter is the simplest filter type, and copies the RGB channels of the image data into the feature vector, giving R, G, and B values for each pixel. FIG. 15 shows the original image data (a), the red channel feature image (b), the green channel feature image (c) and the blue channel feature image (d).

Figure 16:
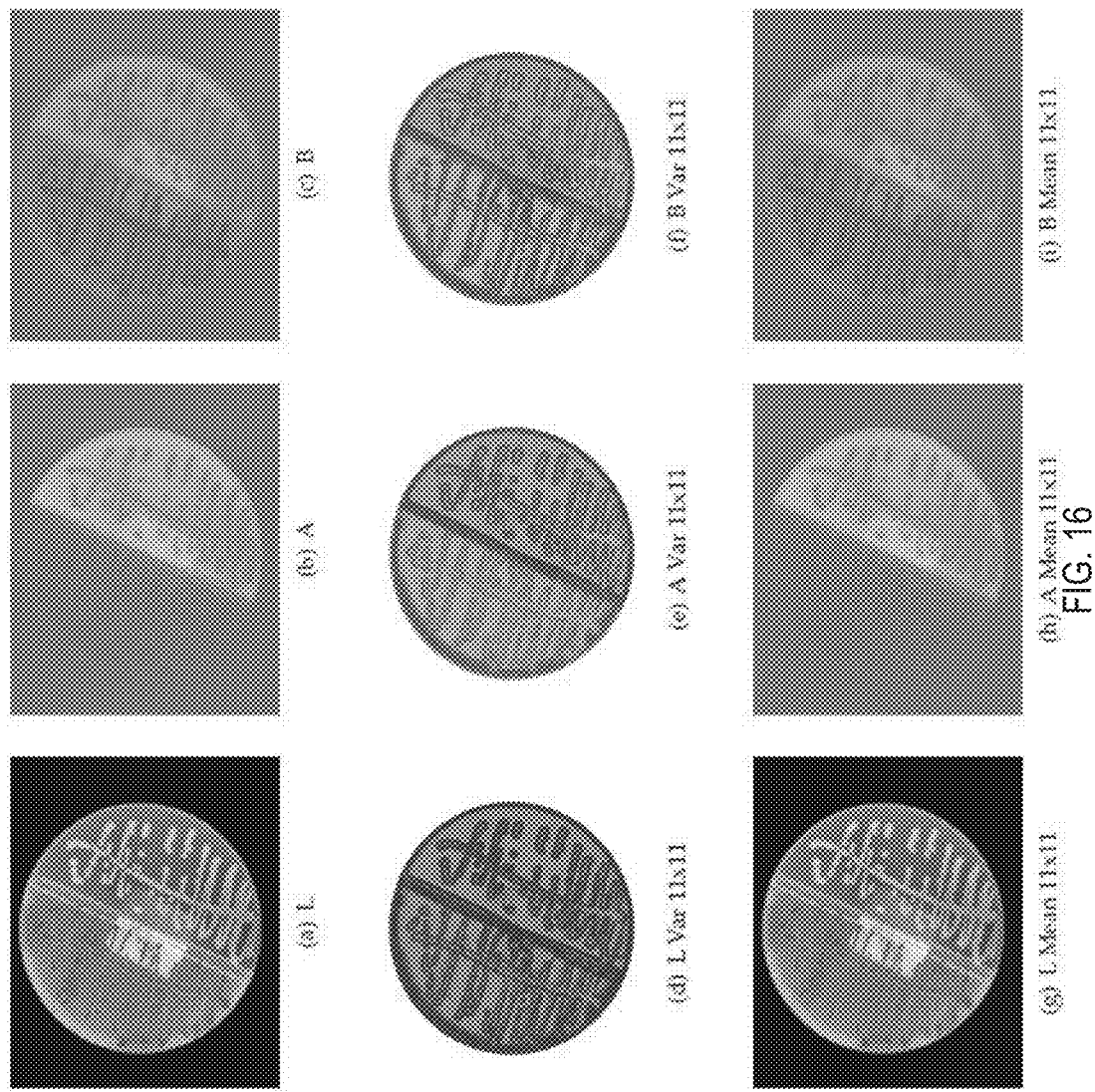
FIG. 16 is a series of representations of (a) a L feature image, (b) an A feature image, (c) a B feature image, (d) a variance of L in an 11×11 window feature image, (e) a variance of A in an 11×11 window feature image, (f) a variance of B in an 11×11 window feature image, (g) a mean of L in an 11×11 window feature image, (h) a mean of A in an 11×11 window feature image and (i) a mean of B in an 11×11 window feature image.

LAB filter—Additional colour information is provided by the LAB filter. This filter primarily converts RGB image data into the LAB colour space (where the L channel represents lightness, and the A and B channels contain colour information). This space allows for easier discrimination between the colours of some bacteria types. In addition, this filter may be used to measure the mean and variance of L, A, and B in different sized windows. 5×5, 11×11 and 21×21 windows have been found to provide good results. This additional information on colour in the neighbourhood of a pixel can aid in distinguishing between types with a similar appearance, which may share colours for individual pixels, but differ in the range of colours seen over larger regions. FIG. 16 shows a L feature image (a), an A feature image (b), a B feature image (c), a variance of L in an 11×11 window feature image (d), a variance of A in an 11×11 window feature image (e), a variance of B in an 11×11 window feature image (f), a mean of L in an 11×11 window feature image (g), a mean of A in an 11×11 window feature image (h) and a mean of B in an 11×11 window feature image (i).

Oriented Gaussian Filter, which applies a 1D Gaussian kernel in a variety of directions to the image. It is also possible to utilise first and second order derivatives of the Gaussian kernel.

Position filter—The position filter provides the classifier with the distance of each pixel from the edge of the culture plate. This feature was motivated by the observation that very difficult cases often occur on the edge of the culture plate either on the meniscus of the agar, or above the plastic feet of the dish. The presence of the position information allows the classifier to adapt for the varying appearance of the culture plate at different distances from the edge. The distance of each pixel from the edge is obtained by performing a distance transform on the mask image. An example of a position feature image is shown in shown in FIG. 17.

Colour quantisation filter, where the number of colours in the image is reduced, usually via a histogram, to help locate areas of similar colour.

Texture filter—Texture information aids the classifier in distinguishing between types with similar colour, but different surface textures. In applying the texture filter, the image is first converted to greyscale. To reduce noise, the image is then smoothed by convolution with a Gaussian kernel. The 2D Gaussian kernel is defined as:

$$G(x, y) = \frac{1}{2\pi\sigma^2} \exp\left(-\frac{x^2 + y^2}{2\sigma^2}\right)$$

As this kernel is linearly separable, in practice this convolution is performed by first convolving with a 1D Gaussian kernel $$G(x) = \frac{1}{\sqrt{2\pi}\,\sigma} \exp\left(-\frac{x^2}{2\sigma^2}\right)$$

in the x direction, then convolving with a 1D kernel in the y direction, with σ=4:0. The texture filter then extracts edge information, returning the greyscale x and y image gradients at each pixel. Gradient values for the pixels are extracted by convolution with the Sobel kernels, $$S_x = \begin{vmatrix} -1 & 0 & +1 \\ -2 & 0 & +2 \\ -1 & 0 & +1 \end{vmatrix}$$

and $$S_y = \begin{vmatrix} -1 & -2 & -1 \\ 0 & 0 & 0 \\ +1 & +2 & +1 \end{vmatrix}.$$

Figure 18:
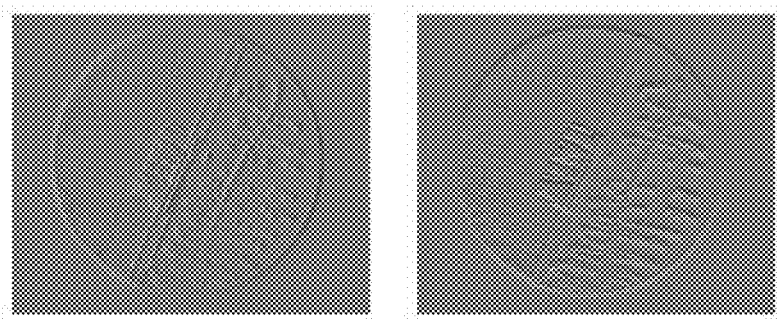
FIG. 18 is a series of representations of (a) a feature image of gradient values in the x direction, (b) a feature image of gradient values in the y direction, (c) a smoothness feature image for a 5×5 window, (d) a smoothness feature image for a 13×13 window and (e) a smoothness feature image for a 21×21 window.
Figure 18:
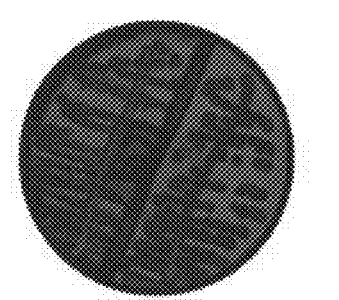
Figure 18:
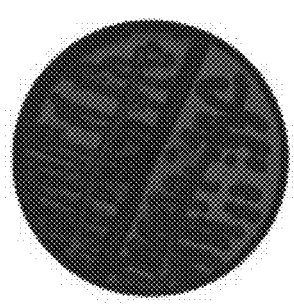
Figure 18:
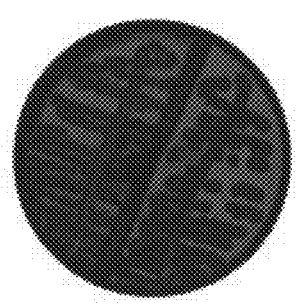

A feature image of gradient values in the x direction is shown in FIG. 18(*a*), and a feature image of gradient values in the y direction is shown in FIG. 18(*b*).

Figure 17:
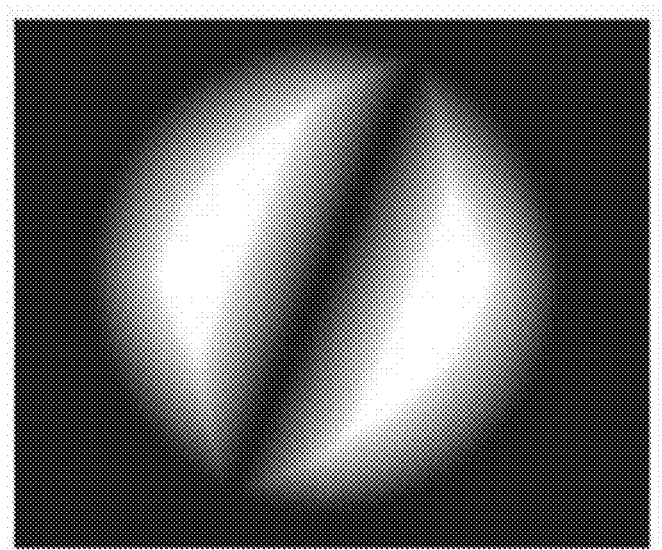
FIG. 17 is a representation of a position feature image for a split culture plate.

The filter also computes a 'smoothness' metric in 5×5, 13×13 and 21×21 pixel windows around the pixel, measuring how textured the culture plate is in that region. The smoothness metric used is the trace of the covariance matrix of the gradient values in each window, giving a measure of the total variance of the gradient in that window. Examples of smoothness feature images for a 5×5, 13×13 and 21×21 window are shown in FIG. 17. (c), (d) and (e) respectively.

Once the feature images have been created, a vector of feature values $x=(x_1, \ldots, x_n)$ for each of a plurality of pixels is generated from these feature images, and passed to the classifier. If there is more than one image for a culture plate (for example a set of first images taken using a top lighting configuration, and a set of second images taken using a bottom lighting configuration), then the feature vector may include values from feature images created using either or both sets of images. A label y associated with each pixel is also passed to the classifier.

A feature vector may be generated for every pixel in the image data, or only in relation to a sample of pixels. Sampling the pixels reduces the computation required and therefore reduces the time taken to train the classifier. A random sampling procedure may be used to select the set of examples used in training from the complete set of labelled pixels. This may be a sparse sampling or dense sampling procedure. The sparse sampling method constructs a separate pool for each class being trained, from which N samples are selected. If the number of labelled pixels for a class is less than this specified number of samples, pixels are sampled with replacement. Training on equally sized sets of examples for each class avoids biasing the classifier towards better performance on more commonly seen types. The dense sampling method retrieves one in every N samples. In training the background classifier, the set of negative examples includes examples of each growth type. For N negative samples and J growth types, N/J samples of each type are selected.

Figure 19:
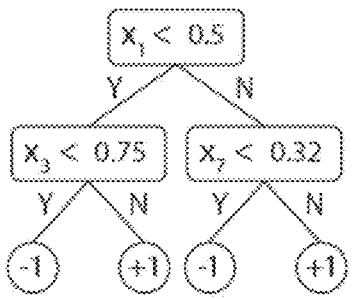
FIG. 19 is an example of a decision tree.

To classify each pixel, and hence either label it as plate background or one of a set of growth types, a classifier must be trained. In this embodiment, a boosted classifier is trained, using decision trees as weak classifiers. In training, a decision tree is built recursively, beginning with a root node, by finding the test at each node which gives the optimal split of the input data into positive and negative samples, then dividing the data according to the test and repeating the process for each child node on its subset of the data. A child node will be split unless the tree has reached a maximum specified depth, all samples in a node belong to the same class, no split can be found giving a better than random separation of the data, or a node has too few samples to perform a meaningful split. An example decision tree is shown in FIG. 19.

The boosting procedure used in this embodiment is Discrete AdaBoost. Pseudocode for Discrete AdaBoost is given below:

---
Algorithm 1 Discrete AdaBoost

Initialise weights $w_i = \frac{1}{N}, i = 1, \ldots, N$ for t = 1, …, T do

Train weak classifier $h_t(x) \in \{-1, 1\}$, minimising error $$\epsilon_t = \sum_{i=1}^{N} w_i [y_i \neq h_t(x_i)]$$

Compute $l_t = \log\left(\frac{1 - \epsilon_t}{\epsilon_t}\right)$

Set $w_i \leftarrow w_i \exp(l_t [y_i \neq h_t(x_i)]), i = 1, \ldots, N$

Renormalize the weights, $w_i \leftarrow \dfrac{w_i}{\sum_{j=0}^{N} w_j}$ end for Output the final classifer $h(x) = \text{sign}\left[\sum_{i=1}^{N} l_t h_t(x)\right]$

---

Discrete AdaBoost iteratively trains a series of T weak classifiers $h_t(x)$, adapting to improve training performance with each additional classifier. Each classifier is trained on the set of N labelled training examples (x, y), with a weight $w_i$ associated with each example indicating that example's relative importance. Each training example (x, y) consists of a feature vector of values $x=(x_1, \ldots, x_n)$, and a label $y \in \{-1, 1\}$ indicating whether it is a positive (+1) or negative (−1) example. The weak classifier is optimised to minimise the error $\epsilon_t$, which is the sum of the weights of the examples classified incorrectly by that classifier.

After training an optimal classifier for a given set of weights, the weights are updated to place a higher importance on examples which are misclassified by the current set of classifiers, to improve performance on these examples for the next classifier. This is done by increasing the weight for a misclassified example based on the error of the classifier, and normalising the weights across all of the examples.

To classify for more than two types using a binary classifier, the AdaBoost.MH procedure may be used. In this algorithm, an additional feature value is added to the feature vector for each pixel, having an integer value (1, ..., J) indicating the class of the training example. For J classes, each training example is repeated J times with the label y for the example set to +1 if J is the class of the sample, or −1 otherwise. The pixel is assigned the class with the strongest classifier result. A confidence value may be set for that pixel depending on the relative strength of the strongest classifier. For example, the confidence value $p_{l_i}(x_i)$ in assigning the label $l_i$ to feature vector $x_i$ computed with the formula for probability of correct classification in a multiclass classifier with J classes may be derived using the following equation:

$$p_{l_i}(x) = \frac{e^{h(x,l_i)}}{\sum_{k=1}^{J} e^{h(x,k)}}, \quad \sum_{k=1}^{J} h(x,k) = 0$$

Several classifiers may be run independently in parallel to obtain results for particular colony types, media types, background clutter, additional colony properties or other distinguishing features.

For better classification speed and performance, classification may be performed as a two stage process. In the first stage, a binary classifier, distinguishing between background pixels and all other types, quickly classifies the majority of background pixels. A multiclass classifier then classifies the remaining pixels.

The initial binary classifier may follow the cascade classifier method. This classifier is intended to rapidly classify much of the background, with a more accurate classification performed in the next stage. As such, a relatively high false positive rate (background pixels classified as foreground) is acceptable, as misclassified pixels can be correctly classified in the next stage. However, the false negative rate should be very low, as this cannot be corrected in the next stage. For fast classification, the number of trees used by the classifier is kept as small as possible. An initial classifier is trained, and its classification performance is tested against a specified maximum false positive rate. If it is greater than this threshold, a new classifier is trained, and this continues until the combination of classifiers has the desired false positive rate. As each classifier is added, the threshold for classification as foreground is adjusted to achieve the desired false negative rate for that classifier stage.

Pseudocode for training a cascade of classifiers is given below:

---
Algorithm 2 Cascade
---
$F_0 = 1.0, D_0 = 1.0$
$i = 0$

---
Algorithm 2 Cascade
---
while $F_i > F_{target}$ do
  i ← i + 1
  $n_i = 0; F_i = F_{i-1}$
  while $F_i > f \times F_{i-1}$ do
    $n_i \leftarrow n_i + 1$
    Use AdaBoost to train a classifier with $n_i$ trees using training examples in P and N
    Set $t_i$ so that current cascade classifier has a detection rate ≥ d × $D_{i-1}$
    Evaluate $F_i$
  end while
  N ← ∅
  if $F_i > F_{target}$ then
    Classify the set of negative examples, and add false detections to the set N
  end if
end while

--- where f is the maximum acceptable false positive rate per stage, d is the minimum acceptable true positive rate per layer, $F_i$ is the false positive rate for stage i, $D_i$ is the true positive rate for stage i, $F_{target}$ is the maximum overall false positive rate, P is the set of positive examples, N is the set of negative examples, and $t_i$ is the classification threshold for each layer, above which a prediction by the classifier at that stage is considered positive.

The output from the training stage is a boosted classifier that can be used to classify pixels in image data for new specimens.

To improve the classification results, labels in the labelled image data may be edited, principally to correct classifier errors, and the classifier re-trained, creating a feedback loop. This may be repeated any number of times, but, in practice, two or three times is usually sufficient. The results from a classifier may also be used as input into a filter, to create feature vectors for training a new classifier as described above.

The classifier may be trained on a server, with a library of training image data. A training program may be executed, and upon completion a classifier written out, along with various statistics and results from the training run. The classifier can then be used to automatically label pixels on a new culture plate.

Automatic Plate Analysis

Figure 20:
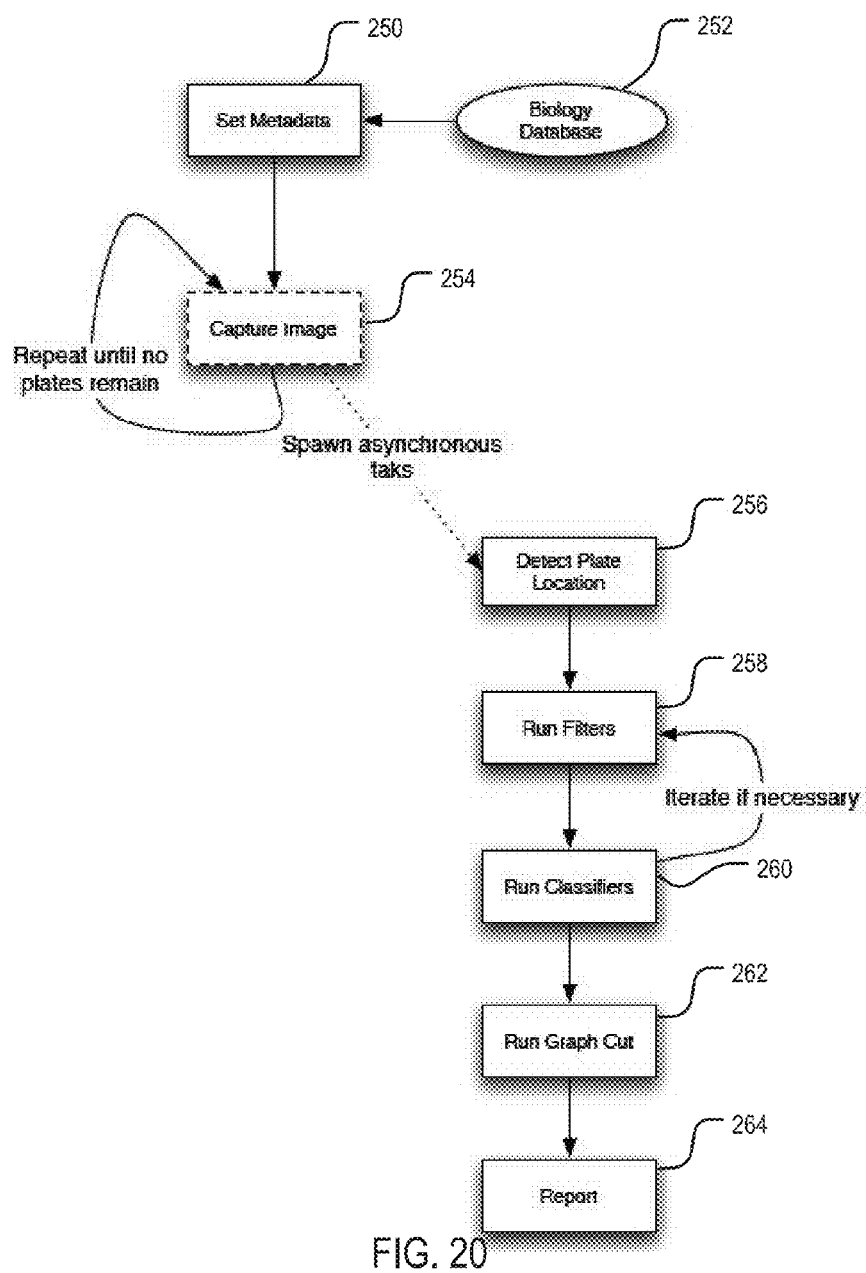
FIG. 20 is a flow chart of a method for analysing a series of images of microbial growth on a solid culture medium.

A method for analysing a new culture plate having unknown microbial growth is shown in FIG. 20. At step 250, the metadata for the culture plate is set. The metadata may be entered by a user or obtained from a LIM System as described above. Options for metadata values may be chosen from a biology database 252. At step 254 an image of the culture plate is captured (or images of multiple culture plates are captured if the culture plates are being bulk processed). The image capture may be performed by an operator via a GUI program as described above. The software then takes the image, demosaics it and detects the culture plate location at step 256, at step 258 runs a set of image filters upon the demosaiced image and then at step 260 feeds the results into the appropriate classifier. The filtering and classification steps are iterated if necessary.

The classifier then generates a per-pixel estimate of the bacteria on the culture plate, which includes a predicted label and the confidence in the label. At step 262 a graph cut is run on the estimate and the output of the graph cut is used to generate a report at step 264.

Figure 21:
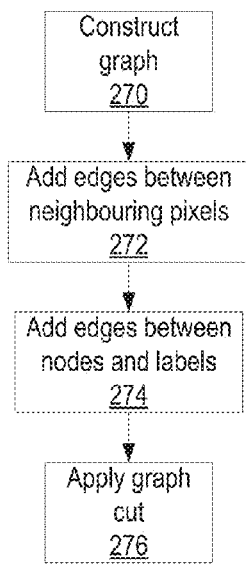
FIG. 21 is a flow chart of a method for applying a graph cut algorithm to improve classification results of the boosted classifier.

Graph cut algorithms compute an optimal partition of a graph into two or more sets. A method for improving pixel classification results is shown in FIG. 21. At step 270, a graph is constructed with each node corresponding to a pixel (or one of a sample of pixels) in the image data. Labels are also added, each label corresponding to a class. At step 272, edges are added between nodes corresponding to adjacent or neighbouring pixels, and at step 274 an edge is added between each node and each label. At step 276, the graph cut algorithm is used to cut edges to a node and partition the graph into classes, the graph cut algorithm using as input the pixel classification results for the pixel corresponding to that node and neighbouring pixels.

Figure 22:
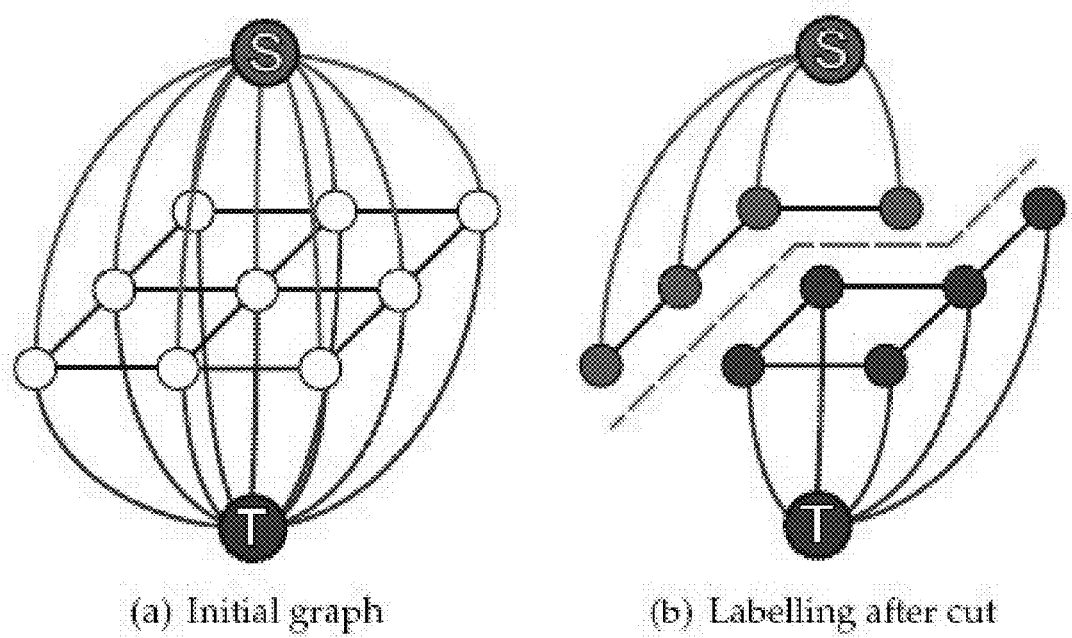
FIG. 22 shows (a) an initial graph and (b) a partitioned graph showing the labelling after a graph cut algorithm has been applied.

FIG. 22 shows an example of an initial graph (a) and the partitioned graph (b) showing the labelling after the cut. In FIG. 22, a source node S and sink node T correspond to the possible node labels. The graph cut determines a label for each node, cutting the edge between each node and the sink or source, and cutting edges between adjacent nodes with different labels. Each time a particular link is cut a cost is incurred. In computing the minimum cost cut, the graph cut procedure minimizes an energy function of the form:

$$E(l, x) = \sum_{i \in N} U(l_i, x_i) + \sum_{p,q \in M} V(l_p, l_q)$$

where l is the set of labels, N is the set of nodes, M is the set of all neighbouring nodes, x is the feature data, $U(l_i; x_i)$ assigns a cost to each node for each possible label assignment (implemented as a cost on cutting the edge to the source or sink), and $V(l_p, l_q)$ assigns a cost to each edge for assigning different labels to the attached nodes.

$$U(l_i, x_i) = \min(-\log(1.0 - p_{l_i}(x_i)), 20.0)$$

$pl_i(x_i)$ is the confidence in assigning label $l_i$ to feature vector $x_i$, computed with the formula for probability of correct classification in a multiclass classifier with J classes where h(x,k) is the classifier result for class k:

$$p_{l_i}(x) = \frac{e^{h(x,l_i)}}{\sum_{k=1}^{J} e^{h(x,k)}}, \quad \sum_{k=1}^{J} h(x, k) = 0$$

while $$V(l_p, l_q) = \begin{cases} 20.0 & \text{if } l_p \neq l_q \\ 0 & \text{otherwise} \end{cases}$$

Other inputs into the graph cut algorithm may include image colour and edge data. Further, the expected colony size for a labelling could be included in the $U(l_i; x_i)$ cost assignment. Another factor that may be taken into account is a predetermined rule from an expert system, such as definitions of colony types that would not appear next to each other or are likely to appear together. This may be incorporated into the smoothness term $V(l_p, l_q)$.

If the number of possible labels is greater than 2, an alpha expansion procedure is used to perform a multiple class labelling from a binary labelling. Psuedocode for an alpha expansion procedure is given on page 2 of Yuri Boykov, Olga Veksler, and Ramin Zabih "*Fast approximate energy minimization via graph cuts*" IEEE Trans. Pattern Anal. Mach. 23:1222-1239, November 2001 as shown below.

1. Start with an arbitrary labeling f
2. Set success := 0
3. For each label $\alpha \in \mathcal{L}$
   3.1. Find $\hat{f}$ = argmin E(f') among f' within one $\alpha$-expansion of f (Section 4)
   3.2. If E($\hat{f}$) < E(f), set f := $\hat{f}$ and success := 1
4. If success = 1 goto 2
5. Return f The procedure iterates over steps 3.1 and 3.2 for each of the possible classes of, for example, bacteria type or background, checking whether any labels in different classes could be switched to that class without increasing the total energy E of the graph. Once the procedure has been repeated for each class and no further energy reduction is possible, the optimal labelling is returned.

Figure 23:
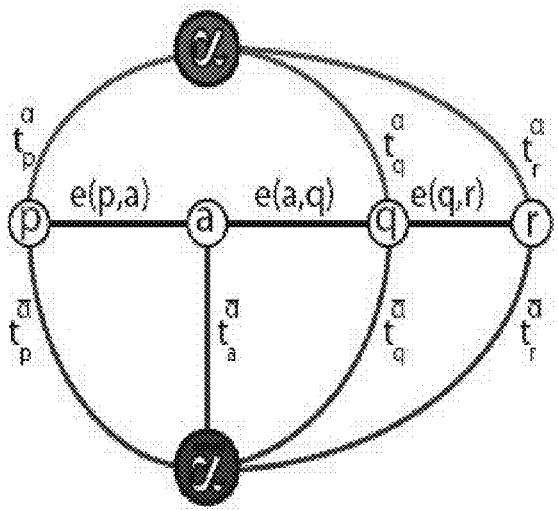
FIG. 23 shows a graph constructed with an auxiliary node for use in the alpha expansion procedure.
Figure 24:
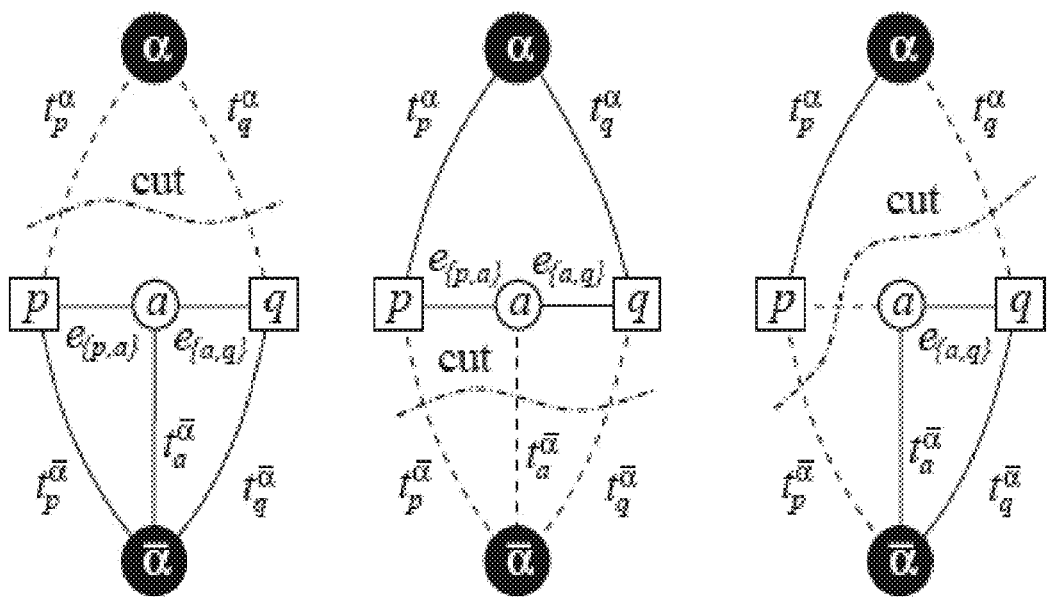
FIG. 24 is a set of graphs showing possible cuts that can be made in the alpha expansion procedure.

In constructing the graph, auxiliary nodes are added between adjacent nodes with different labels, to include the cost of this labelling in the cut. FIG. 23 shows the addition of an auxiliary node a between nodes p and q, and gives the edge weights for this graph. The cost of a cut is equal to the sum of its edge weights. For each pair of pixels, a cut must sever one of three groupings of edges, as shown in FIG. 24. This diagram was taken from page 6 of Yuri Boykov, Olga Veksler, and Ramin Zabih's paper. The alpha expansion procedure determines which of the three groupings has the minimum edge weight and cuts these edges. A pixel is assigned the label alpha if the cut separates the pixel from the label alpha.

Once the graph cut has been performed, the resulting classifications of the pixels may be analysed to output an assessment. This may involve counting how many pixels are labelled in each class to determine the types and quantities of growth on the culture plate. It may involve assessing whether the number of pixels of a particular class is greater than a predetermined number.

Three approaches for counting colonies are proposed:
1. Basic counting, where the colony count is estimated by determining an average colony size for each organism type on each type of agar. The number of pixels of each organism detected on a particular culture plate can be divided by this number to yield the number of colonies.
2. Density based counting, where the distance from the edge of each colony is included in the counting algorithm. This is based on the observation that large areas of growth should be counted as several distinct colonies. Hence interior pixels in the centre of a colony are assigned higher weight to achieve such an outcome. A table is formed from measuring many colony counts manually, and tabulating the results against this metric. The table may then be used to obtain a colony count from the metric when evaluated on an unseen culture plate.
3. Image processing-based counting, where the image containing the labels is analysed first by a connected components algorithm. Each component detected by this algorithm is examined in turn. If a particular colony is deemed too large by a preset table of thresholds, then the method proposed as number one is applied. If the colony is deemed too small, it is counted as a single colony. Otherwise, the shape of the component may be considered. If it appears circular, it counts as a single colony. Otherwise, a watershed algorithm is applied to divide the component into individual colonies, each of which increments the colony count.

The counts are then quantified to produce a meaningful measure of growth for a microbiology expert.

The assessment may include an identification of the medium as a negative control. This method determines an expected value for the area of bare agar (e.g. a predefined minimum number of pixels classified as background) and this must exceed a certain minimum area for the image capture and analysis to be valid. The precise area of bare agar that must be visible is derived from a table of values that depend on the type of agar and the other bacteria that are identified on the culture plate.

Clinical rules are used to analyse the result of the pixel classifications and/or quantitation and generate the assessment. The clinical rules may involve a table incorporating the type of patient sample, the type of agar, the mix of bacteria that have been identified, national standards, local laboratory practice and some user-customisable rules.

The main metadata and plate metadata files may be updated to reflect the assessment and to add further information extracted from the classifications.

In addition, based on the assessment, each culture plate may then, in an embodiment, be sent to one of four output plate stacks of the apparatus 100 (not shown in the Figures): (1) waste, (2) re-incubate, (3) identification of potentially pathogenic bacteria, or (4) human review required. It is envisaged that in some forms some of these stacks may be merged into a single stack. In any event, an operator can then remove culture plates from the output plate stacks for further action. Once all culture plates have been processed, the whole workflow can be repeated or the system can be shut down.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A method for analysing microbial growth on a solid culture medium, the method including:
    obtaining, using a processor, image data of the solid culture medium and any microbial growth,
    for a plurality of pixels in the image data, generating, using a processor, an associated feature vector of values obtained by applying one or more filters to the image data,
    using a classifier to classify, using a processor, each pixel in the plurality of pixels based on the associated feature vector,
    analysing, using a processor, results of pixel classifications of each said pixel to derive a microbiological assessment of the solid culture medium and any microbial growth, and
    outputting the microbiological assessment.

2. A method according to claim 1, further including enumerating one or more colonies of the microbial growth based on the results of the pixel classifications.

3. A method according to claim 2, further including analysing the results of the pixel classifications using a connected components algorithm to determine a series of regions indicative of predicted colonies of the microbial growth.

4. A method according to claim 3, further including enumerating said one or more colonies of the microbial growth from the series of regions based on a size and/or shape of each of the regions.

5. A method according to claim 1, wherein the classifier is a multi-class classifier for classifying the pixels into three or more classes.

6. A method according to claim 1, wherein the classifier is a boosted classifier.

7. A method according to claim 6, wherein the boosted classifier is a boosted decision tree classifier.

8. A method according to claim 1, wherein using said classifier to classify each said pixel in the plurality of pixels includes:
    using a first classifier to initially classify each pixel as one of a first plurality of classes, and
    subsequently using a second classifier to classify each pixel in one or more of the first plurality of classes as one of a second plurality of classes.

9. A method according to claim 8, wherein the first classifier is a binary cascade classifier to initially classify each pixel as background or non-background, and the second classifier is a multi-class boosted decision tree classifier to classify each non-background pixel as one of the second plurality of classes.

10. A method according to claim 1, further including:
    applying a post processing algorithm to improve the results of the pixel classifications.

11. A method according to claim 10, wherein the post processing algorithm is a graph cut algorithm.

12. A method according to claim 11, further including:
    constructing a graph having a plurality of nodes, each node corresponding to one of the plurality of pixels in the image data, and a plurality of labels, each label corresponding to a class,
    adding edges between nodes corresponding to neighbouring pixels in the image data,
    adding edges between each node and each label, and
    using the graph cut algorithm to cut edges to a node and partition the graph into classes, the graph cut algorithm being based on the pixel classification results for the pixel corresponding to that node and neighbouring pixels.

13. A method according to claim 12, further including assigning a confidence value to each of the pixel classifications, wherein the graph cut algorithm is further based on the confidence value of the pixel classification for the pixel corresponding to that node.

14. A method according to claim 13, wherein the graph cut algorithm is further based on the confidence value of the pixel classification for neighbouring pixels.

15. A method according to claim 1, wherein the assessment includes an identification of the solid culture medium as a negative control.

16. A method according to claim 1, further including using clinical rules to analyse the results of the pixel classifications and derive the assessment.

17. A method for training a classifier for use in analysing microbial growth on a solid culture medium, the method including:
    obtaining, using a processor, image data for a plurality of samples of microbial growth on the solid culture medium;
    for each of a plurality of pixels in the image data, generating, using a processor, an associated feature vector of values obtained by applying one or more filters to the image data; and
    using the associated feature vectors to train a classifier to classify, using a processor, each pixel in the plurality of pixels according to a label associated with the pixel in the image data.

18. A method according to claim 17, wherein the plurality of pixels are sparsely sampled from the image data.

19. A non-transitory computer readable media including software for use with a computer including a processor and memory for storing the software, the software including a series of instructions executable by the processor to carry out a method for analysing microbial growth on a solid culture medium, the method including:

obtaining, using the processor, image data of the solid culture medium and any microbial growth, for a plurality of pixels in the image data, generating, using the processor, an associated feature vector of values obtained by applying one or more filters to the image data, using a classifier to classify, using the processor, each pixel in the plurality of pixels based on the associated feature vector, analysing, using the processor, results of pixel classifications of each said pixel to derive a microbiological assessment of the solid culture medium and any microbial growth, and outputting the microbiological assessment.

20. Apparatus including a processor;

a memory; and software resident in said memory accessible to the processor, the software including a series of instructions executable by the processor to carry out a method for analysing microbial growth on a solid culture medium, the method including:

obtaining, using the processor, image data of the solid culture medium and any microbial growth, for a plurality of pixels in the image data, generating, using the processor, an associated feature vector of values obtained by applying one or more filters to the image data, using a classifier to classify, using the processor, each pixel in the plurality of pixels based on the associated feature vector, analysing, using the processor, results of pixel classifications of each said pixel to derive a microbiological assessment of the solid culture medium and any microbial growth, and outputting the microbiological assessment.

* * * * *